(12) United States Patent
He et al.

(10) Patent No.: US 11,609,471 B2
(45) Date of Patent: Mar. 21, 2023

(54) MINIMALLY COLOR CHANGING N-TYPE ION STORAGE LAYERS, ELECTROCHROMIC DEVICES MADE THEREWITH, AND RELATED METHODS

(71) Applicant: AMBILIGHT INC., Milpitas, CA (US)

(72) Inventors: Jiazhi He, Lafayette, IN (US); Jianguo Mei, West Lafayette, IN (US)

(73) Assignee: AMBILIGHT INC., Milpitas, CA (US)

( * ) Notice: Subject to any disclaimer, the term of this patent is extended or adjusted under 35 U.S.C. 154(b) by 251 days.

(21) Appl. No.: 17/117,524

(22) Filed: Dec. 10, 2020

(65) Prior Publication Data

US 2021/0096437 A1  Apr. 1, 2021

Related U.S. Application Data

(63) Continuation of application No. 16/999,792, filed on Aug. 21, 2020, now Pat. No. 10,962,856, which is a continuation of application No. PCT/US2019/049892, filed on Sep. 6, 2019.

(60) Provisional application No. 62/873,583, filed on Jul. 12, 2019, provisional application No. 62/728,012, filed on Sep. 6, 2018.

(51) Int. Cl.
*G02F 1/1516* (2019.01)
*G02F 1/1523* (2019.01)

(52) U.S. Cl.
CPC ........ *G02F 1/15165* (2019.01); *G02F 1/1525* (2013.01); *G02F 2202/022* (2013.01)

(58) Field of Classification Search
CPC ............... G02F 1/15165; G02F 1/1525; G02F 2202/022; G02F 1/1524; G02F 2001/1502; G02F 1/15
See application file for complete search history.

(56) References Cited

U.S. PATENT DOCUMENTS 5,042,923 A * 8/1991 Wolf .................... E06B 3/6722
                                                              359/275
2010/0265562 A1   10/2010  Reynolds et al.
2013/0265628 A1   10/2013  Noh et al.
2013/0335800 A1   12/2013  Konkin et al.
2016/0026057 A1    1/2016  Choi et al.
2016/0033839 A1    2/2016  Lee et al.

FOREIGN PATENT DOCUMENTS

WO    2019/014776 A1    1/2019

OTHER PUBLICATIONS

PCT International Search Report and the Written Opinion dated Jan. 27, 2020, issued in related International Application No. PCT/US2019/049892 (10 pages).

(Continued)

*Primary Examiner* — James C. Jones

(57) ABSTRACT

A method of making an electrochromic device, includes: providing an electrochromic layer comprising a p-type electrochromic material; providing an ion-storage layer comprising an n-type metal oxide; and tuning the ion-storage layer, the electrochromic layer, or both the ion-storage layer and the electrochromic layer, so that when the electrochromic device is operating, the ion-storage layer operates in a minimally color changing mode.

20 Claims, 16 Drawing Sheets

(56) References Cited

OTHER PUBLICATIONS

Jacob Jensen et al. "Direct Photopatterning of Electrochromic Polymers", Advanced Functional Materials, 2013, vol. 23, pp. 3728-3737. Abstract—p. 3729, col. 2, para 3 to p. 3730, col. 2, para 1, Scheme 1.
Jeonghun Kim et al., "Solution Processable and Patternable Poly(3,4-alkylenedioxythiophene)s for Large-Area Electrochromic Films", Advanced Materials, vol. 23, 2011, pp. 4168-4173.
Michael T. Otley et al., "Acrylated Poly(3,4-propylenedioxythiophene) for Enhancement of Lifetime and Optical Properties for Single-Layer Electrochromic Devices", ACS Applied Materials & Interfaces, vol. 6, 2014, pp. 1734-1739.
Notice of Allowance dated Nov. 20, 2020, issued in related U.S. Appl. No. 16/999,792 (9 pages).

\* cited by examiner

MINIMALLY COLOR CHANGING N-TYPE ION STORAGE LAYERS, ELECTROCHROMIC DEVICES MADE THEREWITH, AND RELATED METHODS

RELATED APPLICATION DATA

The present application is a continuation application of U.S. patent application Ser. No. 16/999,792, filed Aug. 21, 2020, and entitled "MINIMALLY COLOR CHANGING N-TYPE ION STORAGE LAYERS, ELECTROCHROMIC DEVICES MADE THEREWITH, AND RELATED METHODS", which is a continuation application of International Application No. PCT/US2019/049892, filed Sep. 6, 2019, and entitled "MINIMALLY COLOR CHANGING N-TYPE ION STORAGE LAYERS, ELECTROCHROMIC DEVICES MADE THEREWITH, AND RELATED METHODS", which claims the benefit of priority of U.S. Provisional Patent Application No. 62/728,012, filed Sep. 6, 2018, and entitled "LOW-TEMPERATURE SOLUTION PROCESSED METAL OXIDE THIN FILM AS MINIMALLY COLOR CHANGING COUNTER ELECTRODE IN ELECTROCHROMIC DEVICES", and U.S. Provisional Patent Application No. 62/873,583, filed Jul. 12, 2019, and entitled "INORGANIC METAL OXIDE THIN FILM AS COUNTER ELECTRODE IN ELECTROCHROMIC DEVICES". All of the above-identified applications are incorporated by reference herein in their entirety.

FIELD OF THE INVENTION

The present invention generally relates to the field of electrochromic devices. In particular, the present invention is directed to minimally color changing n-type ion storage layers, electrochromic devices made therewith, and related methods.

BACKGROUND

Electrochromic devices (ECDs) are being translated into practical products for a variety of applications, such as smart windows for buildings, self-dimming rearview mirrors, and electrochromic irises, among others. Generally, an ECD is a five-layer structure comprising an electrochromic (EC) layer, an ion-storage (or counter-electrode (CE)) layer, an electrolyte layer located between the EC and CE layers, and a pair of transparent conductive layers each electrically connected to a corresponding one of the EC and CE layers.

The color wheel of solution-processable p-type-dopable cathodically coloring electrochromic polymers (ECPs), which are colored in the neutral state and transmissive (bleached) in the p-type doped state, for use in ECDs has been expanding. It is believed that a large library of p-type ECPs are only about one step away from everyday products because of their desirable attributes, such as high optical contrast, fast response times, long-term optical stability, and, most importantly, solution processability that will allow for high-throughput and economical manufacturing. However, the lack of a CE layer that can be fabricated in a cost-efficient and high-throughput manner currently impedes further progress of developing products that utilize the growing library of p-type ECPs.

Counter electrode materials can be divided according to their electrochromic behavior into three categories, namely, complementary, non-color-changing, and minimally color changing (MCC) CE materials. Complementary CE materials usually have coloration efficiencies comparable to the coloration efficiencies of the corresponding electrochromic materials used in the electrochromic layer(s) of ECDs, and they have an obvious color change during the operation of the ECDs. Electrochromic devices that use complementary CE materials usually have a lower optical contrast compared to the contrast due to the sum of residue color in the bleached state of both the CE and electrochromic materials. A non-color-changing CE material is optically passive.

Currently, and in general, the most widely studied materials for CEs are p-type radical polymers that need oxidizing pretreatments when coupled with p-type dopable ECPs. As non-color-changing materials, these p-type radical polymers experience non-color-changing. Therefore, they would seem to be good candidates to couple with the high coloration efficiency p-type ECPs.

Researchers have developed N-alkyl-substituted poly(3, 4-propylenedioxypyrrole) (PProDOP) as an MCC CE material. The PProDOP with N-C18 substitution has a low coloration efficiency of 35 $cm^2$ $C^{-1}$ at a 555 nm wavelength and was proposed as a solution-processable MCC CE material to pair with an ECP-magenta (p-type) EC material having a coloration efficiency of approximately 633 $cm^2$ $C^{-1}$ at 555 nm. However, PProDOP is also a p-type material. To pair with p-type cathodically coloring ECPs as a CE, the PProDOP must be either electrochemical or chemical pre-oxidized. This additional step of pre-oxidation for preparing a CE layer suitable for use with a p-type EC layer is undesirable from manufacturability and production-cost perspectives.

SUMMARY OF THE DISCLOSURE

In one implementation, the present disclosure is directed to an electrochromic device. The device includes a working electrode that includes an electrochromic layer comprising an electrochromic material of a p-type and having a coloration efficiency and a total charge density; and a counter electrode that includes an ion-storage layer comprising an n-type metal oxide and having a coloration efficiency and a total charge density; wherein the coloration efficiency of the electrochromic layer is greater than the coloration efficiency of the ion-storage layer; or the total charge density of the counter electrode is greater than the total charge density of the electrochromic layer; or the coloration efficiency of the electrochromic layer is greater than the coloration efficiency of the ion storage layer and the total charge density of the counter electrode is greater than the total charge density of the electrochromic layer.

In another implementation, the present disclosure is directed to a method of making an electrochromic device. The method includes providing an electrochromic layer comprising a p-type electrochromic material; providing an ion-storage layer comprising an n-type metal oxide; and tuning the ion-storage layer, the electrochromic layer, or both the ion-storage layer and the electrochromic layer, so that, when the electrochromic device is operating, the ion-storage layer operates only in a minimally color changing mode.

In yet another implementation, the present disclosure is directed to a method of preparing an ion-storage layer for an electrochromic device. The method includes preparing a sol that is a precursor to the ion-storage layer, wherein the sol includes a salt that is a precursor to form a metal oxide within the ion-storage layer; a solvent that places the salt into a solution; and an acid selected and provided in an amount to control hydrolysis and condensation during formation of a gel from the sol; coating a conductive substrate with the sol to form a coating; and heating the coating to a temperature of no greater than about 150° C. for at least 1 minute so as to promote network formation within the metal oxide.

In still another implementation, the present disclosure is directed to a method of preparing an ion-storage layer for an electrochromic device. The method includes preparing a sol that is a precursor to the ion-storage layer, wherein the sol includes a salt that is a precursor to forming a metal oxide within the ion-storage layer; and a solvent that places the salt into a solution; determining whether or not the sol is stable; if the sol is stable, then using the solution without any stabilizing additive to prepare the ion-storage layer; and if the sol is not stable, then adding one or more stabilizing additives to the solution so as to make the sol stable prior to using the sol to prepare the ion-storage layer.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
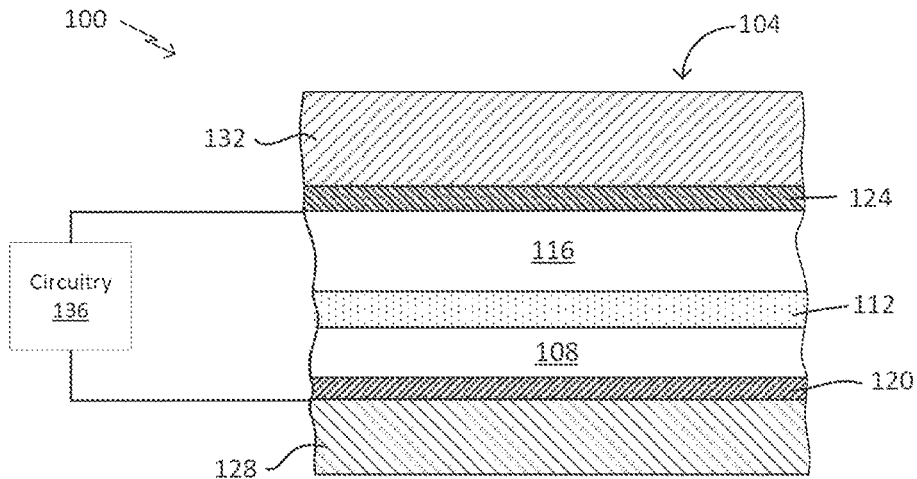
FIG. 1 is a partial cross-sectional view/partial diagrammatic view of an electrochromic product that includes an electrochromic device (ECD) made in accordance with the present disclosure.

In some aspects, the present disclosure is directed to electrochromic devices (ECD) having p-type electrochromic (EC) layers and n-type minimally color changing (MCC) ion storage (or counter-electrode (CE)) layers. Examples of ECDs having this combination of EC and CE layers include all-solid-state flexible film type ECDs, as well as ECDs having other constructions, such as more rigid ECDs and ECDs having liquid or gel electrolytes. As described below in detail, n-type MCC EC layers of the present disclosure may be made of amorphous (a-) metal oxides that may be made using low-temperature (e.g., in a range of about 20° C. to about 150° C.) solution-based fabrication techniques and without the need for being pre-oxidized, which is required for p-type CE layers. In some embodiments, the low-temperature techniques are augmented with ultraviolet-ozone (UVO) treatment, which may be performed in an ambient air environment, to assist in removing unwanted materials, such as solvents, used to make the metal oxides. When used, the UVO treatment may be applied before, after, and/or during or after the low-temperature treatment.

It is believed that, prior to MCC CE layers made in accordance with the present disclosure, n-type solution-processed metal oxide as MCC CE layers were not available, thus hampering cost-effective deployment of ECDs having EC layers composed of electrochromic polymers (ECPs) in the growing library of p-type ECPs mentioned in the Background section above. While n-type MCC CE layers of the present disclosure can be paired with ECP EC layers, other types of EC-layer materials can be used, such as metal-oxide EC materials, transition metal complexes, quantum dots, perovskites, etc.

In some aspects, the present disclosure is directed to methods of making UVO and/or low-temperature solution-processed MCC CE layers suitable for use, for example, in the ECDs described immediately above. In some embodiments, these methods may be characterized as methods for tuning MCC CE layers for optimal performance in an ECD. Examples of such tuning include configuring an MCC CE layer to minimize its color change within a functioning ECD and configuring an MCC CE layer so that the overall ECD achieves a higher color purity than is achievable using conventional CE layers. Regarding maintaining color purity, in some embodiments, an ECD is designed to have a particular color when in the colored state. This can be achieved by selecting one or more p-type ECPs from the developing color wheel of p-type ECPs mentioned in the Background section above and then selecting an MCC material having a low hue and a high transmittance in both its neutral and charged states.

Tuning methods disclosed herein include, but are not limited to: designing and configuring an MCC CE layer, and/or a corresponding EC layer, so that the MCC CE layer has a charge density greater than the charge density of the EC layer; designing and configuring an MCC CE layer to have a lower coloration efficiency than the EC layer; selecting an MCC material that has a high transparency in its neutral state; and selecting an MCC material having a low hue in both its neutral and charged state, among others. Here, the total charge density is reported per unit area of the relevant layer. In some embodiments, using one of the foregoing tuning methods may be sufficient for a particular application, whereas in some embodiments, using two or more of the foregoing tuning methods may be desired or necessary to achieve the desired results. In some embodiments, tuning methods include forming a highly networked a-(metal-oxide) CE layer having a relatively low porosity, for example, as compared to solution-processed metal-oxide EC layers.

In some aspects, the present disclosure is directed to methods of preparing a sol precursor for use in a sol-gel process forming a highly networked a-(metal-oxide) layer, such as for an MCC CE layer, for example, an n-type MCC CE layer. In some embodiments, a method of preparing a sol includes mixing one or more precursor salts, each of which is a precursor to the metal oxide in the metal oxide layer, with one or more organic solvents and adding one or more ligands and/or one or more acids to the mixture, with the ligand(s) and/or the acid(s) provided in corresponding respective amounts that stabilizes the sol such that undissolved particles in the sol remain colloidal and do not precipitate out of the sol.

These and other aspects of the present disclosure are described below in detail.

Benefits of MCC CE layers made in accordance with the present disclosure include, but are not limited to: the ability to manufacture ECDs using highly scalable roll-to-roll manufacturing; ability to exploit the growing library of p-type ECDs; the ability to achieve ECDs that maintain purity of the color provided by the EC layer; and the ability to fabricate a-(metal-oxide) layers that can withstand high levels of ECD bending without cracking.

Throughout the present disclosure, the term "about" when used with a corresponding numeric value refers to ±20% of the numeric value, typically ±10% of the numeric value, often ±5% of the numeric value, and most often ±2% of the numeric value. In some embodiments, the term "about" can mean the precise numeric value stated.

I. Example ECD and ECD-Containing Product

Referring now to the drawings, FIG. 1 illustrates a product 100 containing an ECD 104 made in accordance with the present disclosure. The product 100 may be any product that comprises an ECD, including, but not limited to, vehicle rearview mirrors, sunroofs, smart-glass windows, eyeglasses, and electronic apertures, among others. In this example, the ECD 104 comprises a CE layer 108, an electrolyte layer 112, an EC layer 116, a first transparent conductive layer 120, and a second transparent conductive layer 124. Other components of product 100 may include a first outer layer 128, a second outer layer 132, and drive circuitry 136 for providing a driving voltage for changing the ECD 104 between its colored and bleached states. Each of the layers 108, 112, 116, 120, and 124 is described below.

I.A. Tuning Color Efficiency of a Metal Oxide Layer

In some embodiments, the CE layer 108 comprises a one or more metal oxide n-dopable material formed in one or more layers to a desired thickness $T_{CE}$. Examples of n-dopable metal oxides are provided below in Section I.C. In addition, Section III, below, describes detailed examples that use $Nb_2O_5$ as the n-dopable metal oxide. The CE layer 108 may be formed using a special sol-gel process that causes the formed metal oxide to be amorphous and highly networked, thereby causing the metal oxide CE layer 108 to have a low porosity. This low porosity does not allow as many ions from electrolyte layer 112 to intercalate into the metal oxide and effectively cause the color change, which in turn reduces the coloration efficiency of CE layer 108. As used herein and in the appended claims, and as known in the art, the term "coloration efficiency", and like terms, is defined as the relationship between the injected/ejected charge per unit area as a function of the change in optical density. It is noted that the term "coloration efficiency" covers one, the other, or both, of the visible spectrum and the infrared (IR) spectrum, depending on the application of the ECD 104 at issue.

In some embodiments, it is desirable that the CE layer 108 be an MCC CE layer, and providing a suitable n-dopable a-(metal-oxide) layer having a low coloration efficiency can enable or contribute to the CE layer 108 performing as an MCC CE layer. In this connection, as used herein and in the appended claims, the term "minimally color changing" means that a CE layer, such as the CE layer 108, has a transmittance (T %) at least higher than 55% across the visible IR regions of the electromagnetic spectrum for each of the bleached and colored states when deployed in an ECD. In some embodiments, the transmittance of an MCC CE layer of the present disclosure is at least 65%. In some embodiments, the transmittance of an MCC CE layer of the present disclosure is at least 75%. In some embodiments, the coloration efficiency of the CE layer 108 is greater than the coloration efficiency of the EC layer 116. In some embodiments, the coloration efficiency of CE layer 108 is about 50 $cm^2\ C^{-1}$ or lower across the visible wavelength spectrum and/or the IR spectrum. In some embodiments, the coloration efficiency of CE layer 108 is about 40 cm² C⁻¹ or lower. In some embodiments, the coloration efficiency of CE layer 108 is about 30 cm² C⁻¹ or lower.

A process that can be used to make a metal oxide layer, such as can be used for the CE layer 108, is to prepare a homogeneous precursor sol that includes 1) one or more salts that is/are a precursor to the desired inorganic metal oxide layer, 2) one or more polar solvents, and 3) none, one, or both of at least one ligand and at least one acid. Here, both ligand and acid can work as stabilizing additives. In order to produce a highly structured, low coloration efficiency metal oxide layer from the precursor sol, in some embodiments the precursor sol must be stabilized to keep undissolved particles in the precursor sol in colloidal suspension, typically, at room temperature and exposed to ambient environments. Keeping the precursor sol stable inhibits both agglomeration and precipitation of relatively large particles both before coating and during gelation that would result in a more porous, and therefore higher coloration efficiency, metal oxide layer, which is undesirable when using the metal oxide layer as an MCC CE layer, such as in the CE layer 108 of the ECD 104 of FIG. 1. In some embodiments, a precursor sol is "stable" or in a "stabilized condition" under the meanings herein, when the precursor sol is kept at standard atmospheric conditions for six months without coalescing and without precipitation. In some embodiments, a precursor sol is stable or in a stabilized condition when the precursor sol is kept at standard atmospheric conditions for at least 30 days without coalescing and without precipitation. In some embodiments, a precursor sol is stable or in a stabilized condition when the precursor sol is kept at standard atmospheric conditions for at least 1 day without coalescing and without precipitation. Consequently, as used herein and in the appended claims, a "stabilizing additive" is an additive that, either alone or in combination with one or more other stabilizing additives, contributes to the stabilizing of a precursor sol that otherwise does not meet the desired or necessary stabilized condition.

Depending on the particular precursor sol composition at issue, in some embodiments the precursor sol may be stable without needing any stabilizing additive(s). However, in some embodiments the precursor sol is stabilized by adding a specific amount of each of one or more stabilizing additives, such as one or both of a ligand (or mixture of ligands) and an acid (or mixture of acids). Whether or not a particular precursor sol is stable without a stabilizing additive may be determined using a titration process. If it is determined that the precursor sol is not stable without any stabilizing additive, the amount of each of the one or more stabilizing additives may be initially determined also using a titration process to discern the needed amounts based on the composition of the metal-oxide precursor and solvent solution and the particular ligand(s) and/or acid(s) used and whether or not the resulting stability is acceptable. Those skilled in the art will readily understand how to perform the titration process such that further explanation is not needed for enabling the process.

While not being limited to any particular theory or explanation of why stabilizing the precursor sol results in a highly networked and less porous metal oxide layer, a contributing factor may be that the ligand(s) and/or acid(s) cause steric hindrance and/or electrostatic repulsion between the colloidal particles that keep the colloidal particles of the stabilized precursor sol in suspension. Then, during post-coating treatment to form the metal oxide layer, these smaller particles order themselves into a highly structured network, rather than first agglomerating into larger particles that form a more open network. Addition of ligand(s) and/or acid(s) may also affect the rates of hydrolysis and condensation during the gelation process, also resulting in a more highly networked amorphous metal oxide layer.

After the homogeneous precursor sol has been made and stabilized as desired/needed, it may be wet-coated onto a suitable substrate, here, transparent conductive layer 120. This coating may be performed in any suitable manner, such as spin coating, dip coating, knife coating, wire-bar coating, gravure coating, extrusion coating, screen coating, microgravure coating, and slot-die coating, among others. The coating may be of any suitable thickness, such as a thickness for producing the thickness $T_E$ of the CE layer 108 as a single coating layer or a thickness for producing the overall thickness $T_E$ in multiple layers.

Following coating, in some embodiments the precursor sol coating is heat treated at a low temperature, preferably about 150° C. or lower, such as in a range of about room temperature (about 20° C.) to about 150° C. These temperatures are particularly suited for use with various polymers, such as polyethylene teraphthalate (PET), that may be present in any substrate for the coated precursor sol, such as in the transparent conductive layer 120. This heat treatment helps drive off components (e.g., organic residue and molecular water) of the precursor sol that are not desired in the metal oxide network. If suitable for a particular application, the heat treatment may be performed at a temperature higher than about 150° C., for example, if the materials subjected to the heating can withstand such a temperature without any detrimental effect. In some embodiments, the precursor sol coating is held at a desired temperature, such as in the ranged noted above, for a sufficient amount of time to drive off the desired amount of unwanted components in the precursor sol coating. In some embodiments, this amount of time may be in a range of 1 min to 2 hours or more. The precursor sol coating may optionally be subjected to ultraviolet ozone (UVO) treatment before, during, and/or after the heat treatment described above. UVO treatment may be performed in a suitable UVO chamber, examples of which are known in the art. In some embodiments, UVO treatment is performed in an ambient air environment. The optional UVO treatment can assist in removal of all organic material within the precursor sol coating other than the metal oxide network. The particular UV parameters, including UV wavelength, intensity, continuous or pulse mode can be selected for the specific sol solution. UVO treatment can be used either before or during or after the heat treatment.

I.B. Tuning Relative Total Charge Densities of the CE and EC Layers

In some embodiments utilizing an MCC CE layer for the CE layer 108 of the ECD 104 of FIG. 1, it can be desirable to design the CE layer and the EC layer 116 in conjunction with one another so that the CE layer functions primarily only in an intermediate-charge regime while the EC layer functions in a full-charge regime. In other words, only part of the total charge from the CE layer is used to cause a complete color change of the EC layer. As an example, in a scenario in which there is a 1:2 ratio between the total charge density of an EC layer and a CE layer of an ECD, only 50% of the total charge of the CE layer is needed to cause a complete color change of the EC layer. In this way, the EC layer 116 can operate in a full coloring/bleaching regime, while the CE layer 108 operates in a partial coloring/bleaching regime. Because the CE layer experiences only partial change in total charge, it does not experience a complete color change and thereby contributes to the MCC characteristics of the CE layer. As such, in some embodiments the EC layer 116 can provide nearly all of the color change to the ECD 104, while the CE layer 108 interferes minimally with that color change, especially if the material selected for the CE layer has a high transmittance throughout the intermediate-charge regime. Tuning the relative total charge densities of the CE and EC layers 108, 116 relative to one another so that the CE layer has a higher total charge capacity than the EC layer can accomplish this goal.

In some embodiments, the material/layer, such as an n-dopable a-(metal-oxide) (layer), provided for the CE layer 108 has a total charge density of equal to or greater than 1.0 times the total charge density of the EC layer 116. In some embodiments, the material/layer, such as an n-dopable m a-(metal-oxide) (layer), provided for the CE layer 108 has a total charge density of 2 or more times the total charge density of EC layer 116. In some embodiments, the material/layer, such as an n-dopable a-(metal-oxide) (layer), provided for CE layer 108 has a total charge density of 3 or more times the total charge density of EC layer 116. The relative total charge densities of the CE and EC layers 108, 116 can be tuned, for example, in one or both of two ways.

One way of tuning the total charge densities of the CE and EC layers 108, 116 is to select materials/layers having differing volumetric charge densities. It is noted that volumetric charge density can vary depending on the number of sub-layers used to make a CE layer, such as the CE layer 108 of the ECD 104 of FIG. 1. This is why the examples in the foregoing paragraph are expressed in terms of both material and layer. An example of volumetric charge densities in the context of an $Nb_2O_5$ MCC CE layer is presented below and illustrates this point. As an example of selecting differing volumetric densities, assuming that the thicknesses $T_{CE}$ and $T_{EC}$ of, respectively the CE layer 108 and the EC layer 116 are identical to one another, the volumetric charge density of one, the other, or both, of the CE and EC layers may be selected so that the total charge density of the CE layer is greater than 1 times the total charge density of the EC layer, at least 5 times greater than the total charge density of the EC layer, or at least 5 times greater than the total charge density of the EC layer. For equal-thickness CE and EC layers 108, 116 (i.e., $T_{CE}=T_{EC}$), the corresponding total charge density of the CE layer will be, respectively, greater than 1 times the total charge density of the EC layer, at least 5 times greater than the total charge density of the EC layer, or is at least 5 times greater than the total charge density of the EC layer.

Another way to tune the relative total charge densities of the CE and EC layers 108, 116 is to select the respective thicknesses $T_{CE}$ and $T_{EC}$ in conjunction with one another while considering the volumetric charge densities of the corresponding materials/layers. For example, assuming the volumetric charge densities of the CE and EC layers 108, 116 are identical and that the volumetric charge density does not change with layer thickness, to achieve a total charge density within the CE layer of greater than 1 times the total charge density of the EC layer, the thickness $T_{CE}$ of the CE layer will have to be a corresponding greater the thickness $T_{EC}$ of the EC layer. Similarly, to achieve a total charge density within the CE layer 108 of 5 or more times the total charge density of the EC layer 116, the thickness $T_{CE}$ of the CE layer will have to be a corresponding 5 or more times the thickness $T_{EC}$ of the EC layer. Likewise, to achieve a total charge density within the CE layer 108 of 10 or more times the total charge density of the EC layer 116, the thickness $T_{CE}$ of the CE layer will have to be a corresponding 10 or more times the thickness $T_{EC}$ of the EC layer.

As noted above, either one of these two ways of tuning relative total charge capacity can be used under suitable conditions. Both of these ways may also be used together for the greatest variability in tuning the relative total charge densities.

I.C. Example Materials for an MCC CE Layer and Precursor Sol

As noted above, in some embodiments the CE layer 108 may be an MCC CE layer composed of a metal oxide. Examples of suitable metal oxides for CE layer 108 include, but are not limited to $TiO_2$, $Ta_2O_5$, $WO_3$, $Nb_2O_5$, $V_2O_5$, $MoO_3$, NiO, ZnO, $Co_3O_4$, $CeO_2$, IrOx, $MnO_2$, and $FeO_x$, among others, and combinations thereof, wherein x=2 or 3. Corresponding salt precursors for some of these metal oxides and other metal oxides can include, but are not limited to $Ti(OCH(CH_3)_2)_4$, $TaCl_5$, $Ta(OC_2H_5)_5$, $(Ta[N(CH_3)_2]_5)$, $WCl_6$, $Nb(OC_2H_5)_5$, $VCl_3$, $VO(OCH(CH_3)_2)_3$, $Mo(OH)_6$, $Ni(NO_3)_2.6H_2O$, $Zn(CH_3COO)_2.2H_2O$, $Co(NO_3)_2.6H_2O$, $Cr(NO_3)_3$, $CrCl_3$, $Cr(C_5H_7O_2)_3$, $FeCl_3$, $FeNO_3$, $RhCl_3$, $IrCl_3$, $WCl_3$, $Mn(CH_3COO)_2$, $MnCl_2$, and $Ce(NH_4)_2(NO_3)_6$, among others, and combinations thereof. Generally, a suitable metal oxide may comprise any one or more of the metal elements selected from elements in Groups 3 to 5 and Group TB to Group VIIB of the Periodic Table of Elements. Many n-type metal oxides are low coloration efficiency materials. They remain highly transparent in the neutral state and change colors during the reduction process. In some embodiments, n-type metal oxides are desirable for use as an MCC CE layer, especially when used in conjunction with a p-type ECP. Examples of n-type metal oxides include $Ta_2O_5$, $Nb_2O_5$, and $MoO_3$, among others. A suitable n-type metal oxide may be a mixed metal oxide or a doped metal oxide, or a combination of a mixed metal oxide and a doped metal oxide, among others, or more than one of each of these types.

Suitable solvents for use in creating a precursor sol of the present disclosure include, but are not limited to, polar solvents, including alcohols, ethers, and ketones. Specific examples include isopropanol, ethanol, and acetone, and any combination thereof, among others. When mixed with one or more solvents to make a precursor sol, the concentration of the one or more salts may be in a range of about 0.01 mol/L to about 10.0 mol/L, among others.

Example ligands suitable for use in preparing a precursor sol of the present disclosure include, but are not limited to, organic acids, alcohols, ethers, amines or esters, acetic acid, glycols, glycol ethers, citric acid, polyethylene glycol (such as polyethylene glycol 400), ethyl acetate, ethylenediamine, ethylenediaminetetraacetic acid and lactic acid, among others. A particular ligand may be used alone or may be used with one or more other ligands. In some embodiments, a ligand may not be used. When used, the concentration of the ligand(s) in the solution may be in a range of about 0.001 mol/L to about 10 mol/L or in a range of about 0.1 mol/L to about 1.0 mol/L.

Example acids suitable for use in preparing a precursor sol of the present disclosure include, but are not limited to, organic acids, such as acetate acid, citric acid, lactic acid, acrylic acid, formic acid, oxalic acid, uric acid, malic acid, carboxylic acid, sulfonic acid, poly (4-styrenesulfonic acid), among others, and inorganic acids, such as HCl, $HNO_3$, $H_3PO_4$, $H_2SO_4$, $H_3BO_3$, HF, HBr, $HClO_4$, and HI, among others. A particular acid may be used alone or may be used with one or more other acids. In some embodiments, an acid may not be used.

The mixing of the precursor sol may be performed in any suitable manner, such as ultrasonic mixing, among others. When ultrasonic mixing is employed, the mixing time may, for example, be in a range of about 1 minute to 60 minutes, though other mixing times may be used.

I.D. Example Materials for the EC Layer

The EC layer 116 may be made of any suitable EC material, such as a p-doped material. While in some embodiments it is desired that the CE layer 108 have a low coloration efficiency, in these embodiments it is desired that the EC layer 116 have a high coloration efficiency. This is so, so that the EC layer 116 be nearly solely responsible for providing the coloring/bleaching of the ECD 100. In some embodiments, the coloration efficiency of the EC layer 116 is at least 100 cm$^2$ C$^{-1}$. In some embodiments, the coloration efficiency of the EC layer 116 is at least 300 cm$^2$ C$^{-1}$. In some embodiments, the coloration efficiency of the EC layer 116 is at least 600 cm$^2$ C$^{-1}$. In some embodiments, the EC layer 116 comprises a p-type ECP. In some embodiments, the p-type ECP may be a black coloring ECP (referred to herein as "ECP-black") having the following chemical structure:

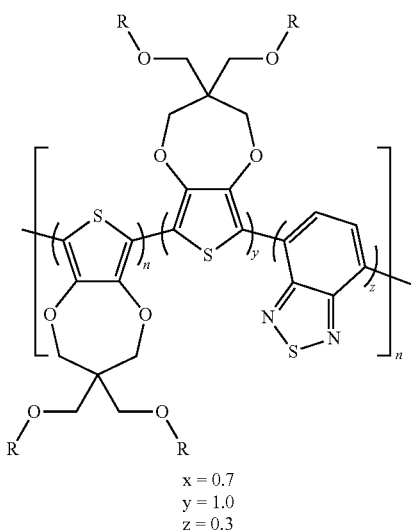

x = 0.7
y = 1.0
z = 0.3 wherein R can be 2-ethylhexyl.

In some embodiments, the p-type ECP may be a magenta coloring ECP (referred to herein as (ECP-magenta") having the following chemical structure:

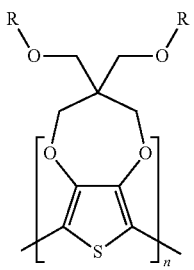

wherein R can be 2-ethylhexyl.

Those skilled in the art will readily appreciate that these are just two examples of p-type ECPs that are currently available, and that there are other p-type ECPs that are currently available and that are likely to become available.

In some embodiments, the EC layer 116 can comprise a material other than an ECP, such as a metal-oxide, transition metal complexes, quantum dots, and perovskites, among others.

I.E. Other Components of an Example Product

Referring again to FIG. 1, the electrolyte layer 112 may be any suitable type of electrolyte layer, such as a solid electrolyte layer (e.g., solid polymer layer), a gel electrolyte layer, or a liquid electrolyte layer. Suitable salts for these layers include, but are not limited to lithium-based salts well known in the field. The composition of the electrolyte layer 112 is not critical, though some embodiments benefit in certain ways from an all-solid-state electrolyte. Any known composition for the electrolyte layer 112 may be used as long as it is suitable for the intended purpose.

Each of the first and second transparent conductive layers 120, 124 can be composed in any suitable manner, such as a thin transparent conductive layer (not illustrated) formed on a suitable transparent substrate (not shown), such as a polymer film (e.g., PET), among others. Transparent conductive layer constructions suitable for each of the first and second transparent conductive layers 120, 124 are well known in the art and need not be detailed herein for those skilled in the art to appreciate the breadth of the present disclosure.

The first and second outer layers 128, 132 may be any transmissive layers suitable for the product 100 at issue. In many applications, such as for windows, sunroofs, and eyeglasses, the first and second outer layers 128, 132 each comprise a glass structure that provides a desired level of rigidity to the product 100 and are robust to environmental conditions. Such glass structures may include glass that is either uncoated or coated with one or more suitable coatings, such as scratch-resistant coating and/or anti-reflection coatings, among others. In mirror-type applications, one of the first and second outer layers 128, 132 will typically include a mirrored surface (not shown), which may be present on either face of that outer layer. Outer layer constructions suitable for each of the first and second outer layers 128, 132 are well known in the art and need not be detailed herein for those skilled in the art to appreciate the breadth of the present disclosure.

The driving circuitry 136 may be any suitable circuitry that provides suitable electrical potentials (including 0 V potential) across the ECD 104 via the first and second transparent conductive layers 120, 124. Depending upon the materials used for the CE and EC layers 108, 116, the suitable electrical potential may be in a range of −1.0V to +1.0V, or in a range of −1.5V to +1.5V, or in a range of −3.0V to +3.0V, or in a range of −4.5V to +4.5V, among others. The driving circuitry 136 may include a binary or variable switch (not shown) (e.g., a potentiometer) for changing the voltage applied across the ECD 104 so as to change the degree of coloring/bleaching. Such a switch may be manually controlled by a person or automatically controlled, such as based on environmental lighting conditions and/or time of day, among others. Circuitry configurations suitable for the driving circuitry 136 are well known in the art and need not be detailed herein for those skilled in the art to appreciate the breadth of the present disclosure.

II. Scalable Fabrication of ECDs Having Metal Oxide MCC CE Layers

Figure 2:
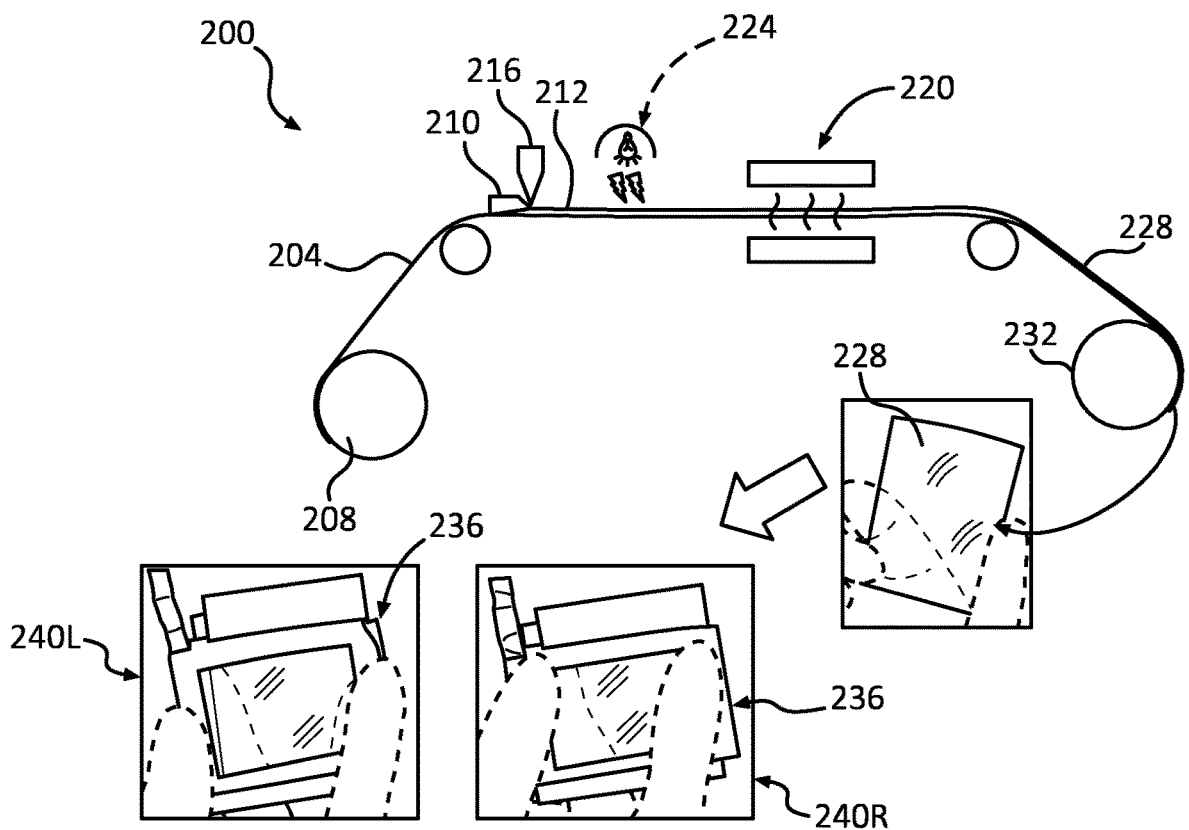
FIG. 2 is a diagram illustrating a roll-to-roll process for forming a counter electrode (CE) for an ECD.

As mentioned above, a benefit of some embodiments of the present disclosure is that ECDs can be made using high-throughput manufacturing techniques, such as roll-to-roll manufacturing. For example, solution-processed CE layers disclosed herein, which can be formed by straightforward coating and low temperature treatment(s) amenable to use with a wide variety of materials, can be used to produce highly flexible ECDs that are largely based on polymer films that could not survive conventional CE-layer processing temperature of 300° C. or higher. FIG. 2 illustrates a roll-to-roll manufacturing process 200 for creating a CE ion-storage layer for an ECD 236, such as CE ion-storage layer 108 for ECD 104 of FIG. 1.

Referring to FIG. 2, a transparent conductive layer 204, which may be the same as or similar to the first transparent conductive layer 120 of the ECD 104 of FIG. 1, is paid-out from an electrode-layer roll 208 from a prior step in an overall process of forming an ECD 236. The transparent conductive layer 204 may comprise a flexible substrate (not shown), such as a polymer substrate (e.g., PET), and a transparent conductive layer (not shown), such as substrates coated with fluorine tin oxide (FTO), indium tin oxide (ITO) or aluminum zinc oxide (AZO), among others. As the transparent conductive layer 204 is moving, a homogeneous precursor sol 210 is coated onto the transparent conductive layer to provide a coating 212 of the desired/necessary thickness, here using a knife-edge-type coating device 216. The homogeneous precursor sol 210 may be made as described in Section I.C, above.

After forming the coating 212, it is subjected to heat treatment by a heat-treatment system 220, which may be any suitable heat-treatment system known in the art. In some embodiments, the heat-treatment system 220 heats the coating 212 to a temperature in a range of about room temperature (about 20° C.) to about 150° C. for, for example, a time in a range of about 1 min. to about 60 min. Those skilled in the art will readily understand how to configure the roll-to-roll manufacturing process to achieve the desired/necessary heat-treatment temperature(s) and heating time(s).

The roll-to-roll manufacturing process 200 may optionally include a UVO-treatment system 224 for subjecting the coating 212 to an ultraviolet ozone treatment under ambient conditions, such as ambient air conditions. The UVO treatment system 224 may be, for example, a conventional UVO-treatment system. While FIG. 2 shows the UVO-treatment system 224 being located upstream of the heat-treatment system 220 in the illustrated process, it may be located downstream of the heat-treatment system and/or coincidentally with the heat-treatment system.

After being subjected to heat treatment and/or UVO treatment, the coating 212 has been transformed into a highly networked a-(metal-oxide) layer (not shown) adhered to the transparent conductive layer 204 so as to form a CE film 228. The CE film 228 is then taken up onto a CE-film roll 232, which may then be used in downstream processing to form the completed ECD 236, which may then, for example, be used as the ECD 104 of FIG. 1. View 240L shows the ECD 236 in a bleached state, whereas view 240R shows the ECD in a colored state. In this example, the EC layer (not shown) is composed of ECP-magenta as detailed in Section 1.D, above.

III. Examples

III.A Amorphous (a-) $Nb_2O_5$ as an n-Type Cathodically Coloring MCC CE

Reagents and Materials. Niobium(V) ethoxide (99.95%), ethanol (99.5%), propylene carbonate (PC), lithium bis(trifluoromethane)sulfonimide (LiTFSI), poly(ethylene glycol) diacrylate (Mn=575) (PEGDA500), 2-hydroxy-2-methylpropiophenone (97%), (HMP), platinum wire (99%, 0.5 mm), and leakless miniature Ag/AgCl electrode ET072 were all purchased from commercial sources. All chemicals were used as received unless otherwise specified.

Instrumentations. All the spectra were collected using an Agilent Cary 5000 UV/vis-NIR spectrophotometer. All the electrochemical measurements were performed using a Biologic SP-150 potentiostat. A Laurell spin-coater (WS-650Mz-23NPPB) was used to prepare all the thin films. UVO treatment was performed using a HELIOS-500 UV-ozone cleaning system. A Veeco dimension 3100 atomic force microscopy (AFM) and a Gaertner variable angle Stokes ellipsometer (L116SF) were used to obtain the thicknesses of a-$Nb_2O_5$ thin films. A Keithley 2400 sourcemeter was used to monitor the potential distribution on the ECP-black working electrode (WE) during the electrochemistry experiments of a two-electrode cell. A Thermo Nicolet Nexus FTIR was used to study the organic and water residues within a-$Nb_2O_5$ thin films.

Preparation and Characterization of Thin Films. A niobium ethoxide precursor sol was prepared in accordance with methods described above in Section I.C. Under ambient conditions, $Nb_2O_5$ thin films were prepared using niobium ethoxide solution via a sol-gel reaction on an ITO/glass or ITO/PET substrate, followed by annealing at various temperatures (100, 150, and 300° C.) for 10 min. The UVO-150° C. a-$Nb_2O_5$ thin films were UVO treated for 20 min. followed by annealing at 150° C. for 10 min. ECP-black and ECP-magenta were synthesized. Solutions of ECP-black (40 mg/mL) and ECP-magenta (25 mg/mL) were prepared by dissolving the polymers in chloroform and stirring overnight before use. ITO/glass and ITO/PET substrates were cleaned by sonicating in acetone and ethanol for 10 min. and blown dry using compressed nitrogen gas. All thin films were prepared by spin-coating at a spin speed of 1500 rpm. The thicknesses of one-layer a-$Nb_2O_5$ thin films were measured by ellipsometry and confirmed by AFM, and their topology was characterized by AFM. As a control experiment, each a-$Nb_2O_5$ thin film on ITO/glass substrate was cut into two pieces. One piece was subjected to the proposed process, and the other piece was kept untreated. The thicknesses of two- and three-layer a-$Nb_2O_5$ thin films were measured by ellipsometry.

Electrochemistry. A three-electrode cell was fabricated with ITO/glass substrates coated with ECP-black or a-$Nb_2O_5$ as the working electrode (WE), a leakless Ag/AgCl as the reference electrode, 0.2 M LiTFSI in PC as the electrolyte, and a platinum wire as the counter electrode. Cyclic voltammetry experiments were performed using a three-electrode cell, at a scan rate of 40 mV/s, to obtain the charge density of electrodes. The charge density was calculated by the equation:

$$\text{charge density} = \int j\, dV/s$$

wherein the charge density has units of mC cm$^{-2}$, j is current density (mA cm$^{-2}$), s is the scan rate (V s$^{-1}$), and V is the voltage (V).

For two-electrode experiments, ECP-coated ITO/glass WEs and a-$Nb_2O_5$-coated ITO/glass CEs were used in 0.2 M LiTFSI in PC electrolyte or PEGDA gel electrolyte with 50 vol % of 0.2 M LiTFSI in PC for liquid- and solid-state devices, respectively. Cyclic voltammetry experiments were performed at a scan rate of 40 mV/s. For in-situ measurements of the potential change of the WE (Ewe), a Keithley 2400 sourcemeter was used, and the voltage between WE and a leakless Ag/AgCl reference electrode was measured. The $E_{we}$ data obtained during the CV experiments were processed using two points smoothing to remove the electrical noise caused by the vibration.

Device Fabrication. The electrolyte was prepared by mixing PEGDA500, 0.2 M LITFSI in PC, and HMP in a volume ratio of 5:5:1 overnight in a nitrogen-filled glovebox. All ECP WEs were prepared by spin-coating the solutions on ITO/glass substrates (30×50×1 mm$^3$, sheet resistance, 8-12 Ω/sq) at a spin speed of 1500 rpm, and a-Nb$_2$O$_5$ CEs were prepared as described previously. Then, they were transferred into the N$_2$ glovebox. 0.2 mL of the mixed electrolyte was titrated on a WE, and a CE was placed on top with the coated sides facing each other. After the electrolyte had spread out by the capillary force, the electrolyte was cross-linked by placing the laminated device under commercial UV lamps emitting at both 365 and 405 nm for 15 min. The device was taken out from the nitrogen-filled glovebox and sealed in the atmosphere by using a General Electric silicone. The flexible device was fabricated by following the same protocol on flexible ITO/PET substrates (sheet resistance 200 Ω/sq).

Figure 3:
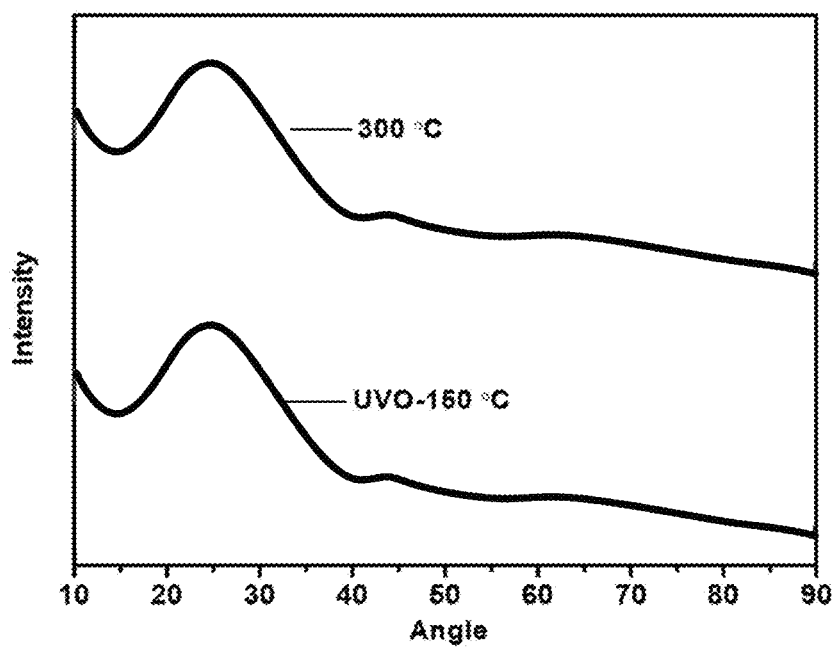
FIG. 3 is a graph of X-ray diffraction patterns for an amorphous (a-) $Nb_2O_5$ layer subjected to an ultraviolet-ozone (UVO) treatment and heat treatment at 150° C. and an a-$Nb_2O_5$ layer subjected to heat treatment at 150° C.
Figure 4A:
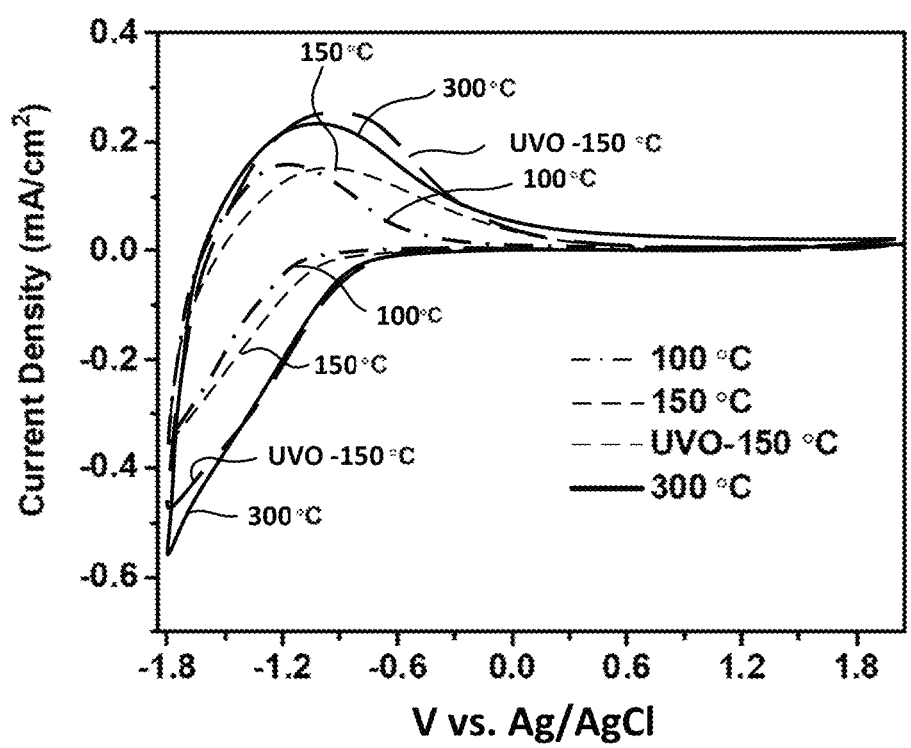
FIGS. 4(A)-(D) contain the following graphs: 4(A) a cyclic voltammograms of UVO-150° C. a-$Nb_2O_5$ thin films annealed at 100° C., 150° C., and 300° C.; 4(B) charge densities of the a-$Nb_2O_5$ thin films of graph 4(A); 4(C) Fourier Transform infrared spectroscopy (FTIR) spectra of UVO-treated, UVO-150° C., and as-spun a-$Nb_2O_5$ thin films annealed at 150° C. and 300° C.; and 4(D) percentage of charge density (Q) normalized by the charge density after electrochemical conditioning $(Q_{ec})$ versus cycle number of the UVO-150° C. a-$Nb_2O_5$ thin film and a-$Nb_2O_5$ thin films annealed at 150 and 300° C.

An in-situ sol-gel reaction was used to fabricate a-Nb$_2$O$_5$ thin films on ITO/glass substrates. The precursor solution was made of niobium(V) ethoxide dissolved in ethanol with a concentration of about 0.19 M. XRD measurements suggested that the Nb$_2$O$_5$ thin films annealed at both 150° C. and 300° C. were amorphous (see, FIG. 3). Cyclic voltammetry (CV) studies were performed to investigate the effect of the processing conditions on the electrochemical properties of a-Nb$_2$O$_5$ thin films. The onset of the reduction potentials of the lithium-ion insertions in a-Nb$_2$O$_5$ thin films annealed at 100° C. and 150° C. was −1.15 and −1.0 V, respectively, which are more negative than the onset potentials of thin films annealed at 300° C. (−0.86 V) (see, FIG. 4(A)). By using UVO treatment followed by annealing at 150° C. ("UVO-150° C."), the onset potential of the lithium-ion insertion (−0.84 V) in UVO-150° C. a-Nb$_2$O$_5$ thin films is comparable to the thin films annealed at 300° C. A larger potential bias might be required to operate ECDs which use a-Nb$_2$O$_5$ thin films annealed at 100° C. and 150° C. as the CEs.

Figure 4B:
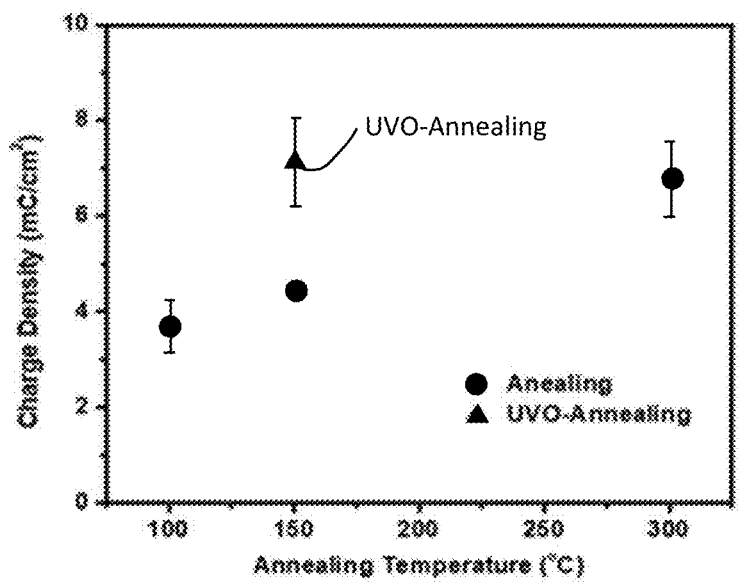

As a CE material, a high charge density is desired to balance the charges consumed in the electrochromic layer. The charge densities can be calculated from the integration of the cyclic voltammograms (see, FIG. 4(B)). Thin films annealed at 100° C. and 150° C. both have a charge density of ~4.0 mC cm$^{-2}$, while UVO-150° C. a-Nb$_2$O$_5$ thin films have a charge density of 7.2±0.9 mC cm$^{-2}$, which is comparable to the charge density of thin films that were annealed at 300° C. (6.8±0.8 mC cm$^{-2}$).

Figure 4C:
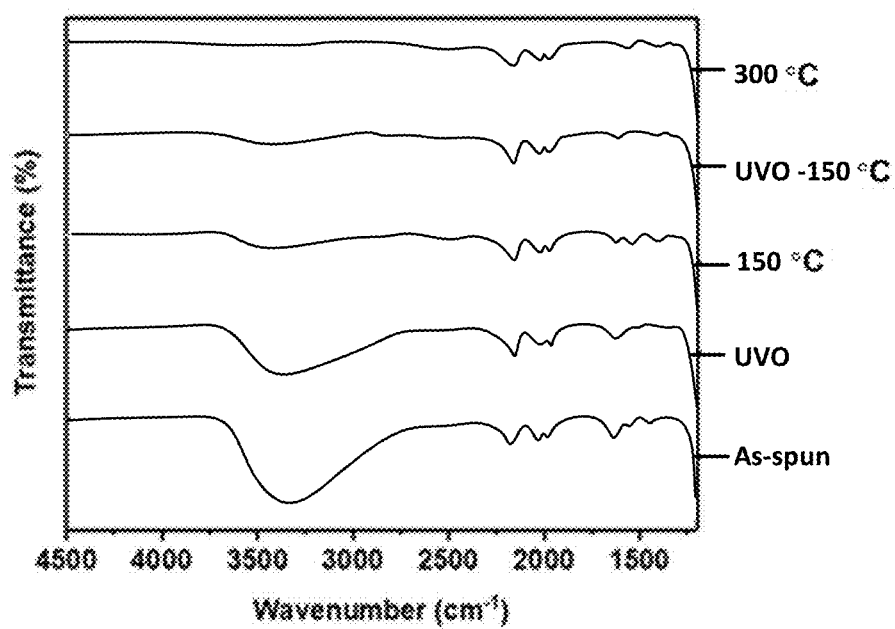
Figure 5:
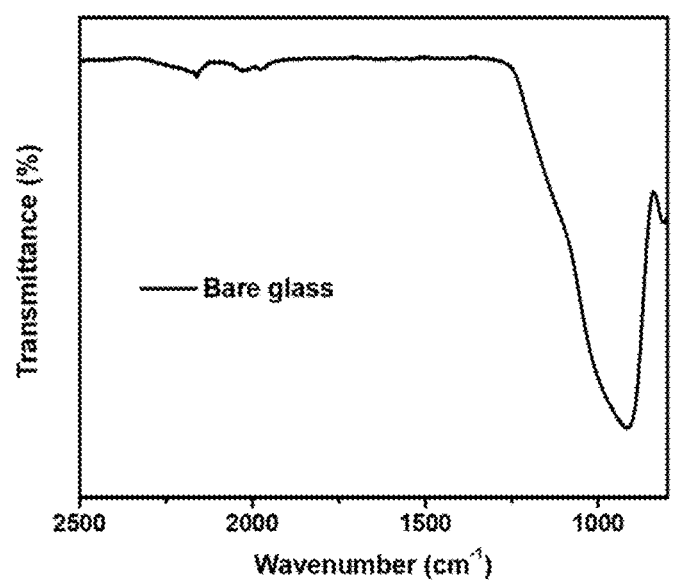
FIG. 5 is an FTIR spectrum of a bare glass substrate.

Fourier-transform infrared spectroscopy (FTIR) studies were performed to get insight into the effect of UVO treatment and annealing temperature (see, FIG. 4(C)). A very strong absorption peak from the glass substrate was centered at ~900 nm$^{-1}$ and influenced the observation of the other peaks (see, FIG. 5). Thus, the spectra are shown from 4500 nm$^{-1}$ to 1200 nm$^{-1}$. The broad absorption peak at ~3300 nm$^{-1}$ is associated with the —O—H stretching of molecular H$_2$O and —Nb—OH, and the peak ~1630 nm$^{-1}$ can be assigned to the bending of H$_2$O molecules. The small peaks around 1400 nm$^{-1}$ can be related to bending and scissoring of the alkane (—C—H) of the organic residues from the precursor solution. The FTIR spectrum of the as-spun a-Nb$_2$O$_5$ thin film showed peaks at ~3300 nm$^{-1}$ and 1630 nm$^{-1}$ and small peaks at ~1400 nm$^{-1}$, which revealed the existence of both molecular water and organic species. The disappearance of peaks at ~1400 nm$^{-1}$ of the UVO-treated a-Nb$_2$O$_5$ thin film suggests that the organic residues can be completely removed by UVO treatment, while the thin film annealed at 300° C. still showed traces of organic species. Most of the molecular water in a-Nb$_2$O$_5$ thin films can be eliminated by annealing at 150° C. and can be completely removed by annealing above 300° C., as seen by the decrease of both —O—H stretching and scissoring peaks in the FTIR spectrum of a-Nb$_2$O$_5$ thin films annealed at 150° C. and the disappearance of them in the FTIR spectrum of a-Nb$_2$O$_5$ thin films annealed at 300° C.

Figures 6A, 6B:
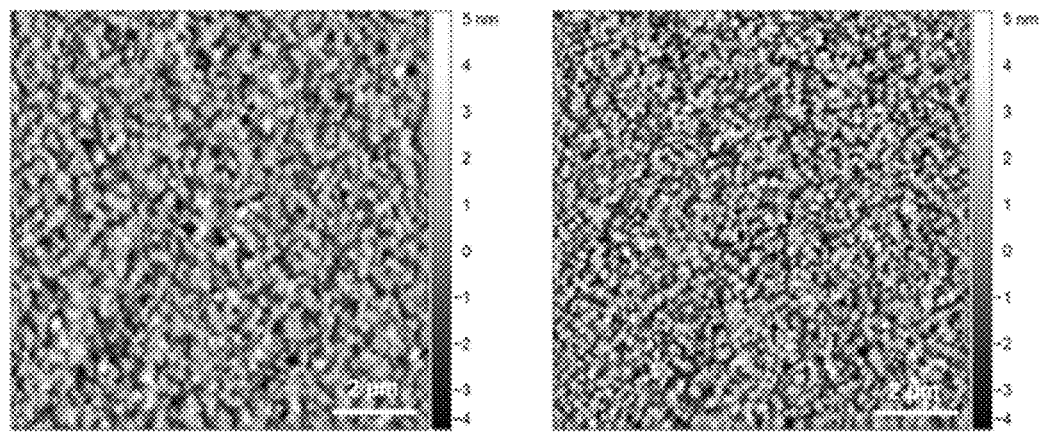
FIGS. 6(A)-(B) contain atomic force microscopy (AFM) images of an a-$Nb_2O_5$ thin film before (A) and after (B) UVO treatment.

The FTIR results suggested that UVO treatment was associated with the photoactivation processes of the solution derived a-Nb$_2$O$_5$ thin films. Under the continuous UV irradiation in an oxygen atmosphere, strong oxidants like ozone or atomic oxygen were generated, and the photolysis of organic residues from ligands and organic solvent led to the formation of free radical species. These highly reactive species promoted the formation of the amorphous metal-oxygen network, resulting in the condensation of the metal oxide thin film. As a result, the organic residues-free and densified thin films would have higher homogeneity and reversibility in the redox reactions. AFM studies were performed to investigate the change of the surface morphology and thickness after UVO treatment (see, FIGS. 6(A) and 6(B)). Compared to the AFM image of the solution-derived a-Nb$_2$O$_5$ thin film (FIG. 6(A)), the UVO-treated thin film (FIG. 6(B)) was more granular-like and porous, and the thickness decreased from 53.7±5.5 to 39.2±2.7 nm, which confirmed the photoactivation process during the UVO treatment. Followed by the low-temperature (150° C.) annealing to remove molecular water, UVO-150° C. a-Nb$_2$O$_5$ thin films had a similar reduction onset potential and charge density as the thin films annealed at 300° C.

Figure 4D:
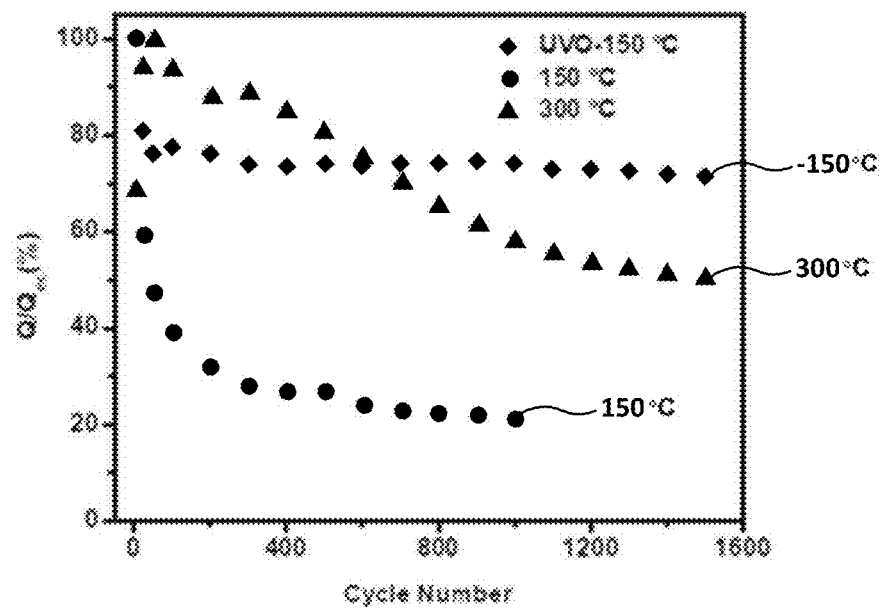

In addition, the effect of organic residues on the electrochemical stability of a-Nb$_2$O$_5$ thin films was investigated. The a-Nb$_2$O$_5$ thin films were cycled by double-potential step chronoamperometry between −1.8 V and 2.0 V for a time interval of 20 s. The charge density was calculated using the chronoamperomagram for each cycle and normalized by the charge density after the electrochemical conditioning (see, FIG. 4(D)). The a-Nb$_2$O$_5$ thin film annealed at 150° C. lost ~80% of its original charge density after 500 cycles, which suggests that organic residues were detrimental to the electrochemical stability of the a-Nb$_2$O$_5$ thin films. In contrast, the UVO-150° C. a-Nb$_2$O$_5$ thin film lost ~28% of its original charge density after 1500 cycles. The remaining charge density was sufficient to balance the charges in the electrochromic layer. Additionally, the a-Nb$_2$O$_5$ thin film annealed at 300° C. showed better cycling stability than the UVO-150° C. a-Nb$_2$O$_5$ thin film during the first 600 cycles but lost ~50% of its charge density after 1500 cycles. Therefore, using UVO-150° C. treatment can induce a more complete formation of metal-oxide bonds, resulting in a densified thin film which has a better electrochemical stability.

Figure 7A:
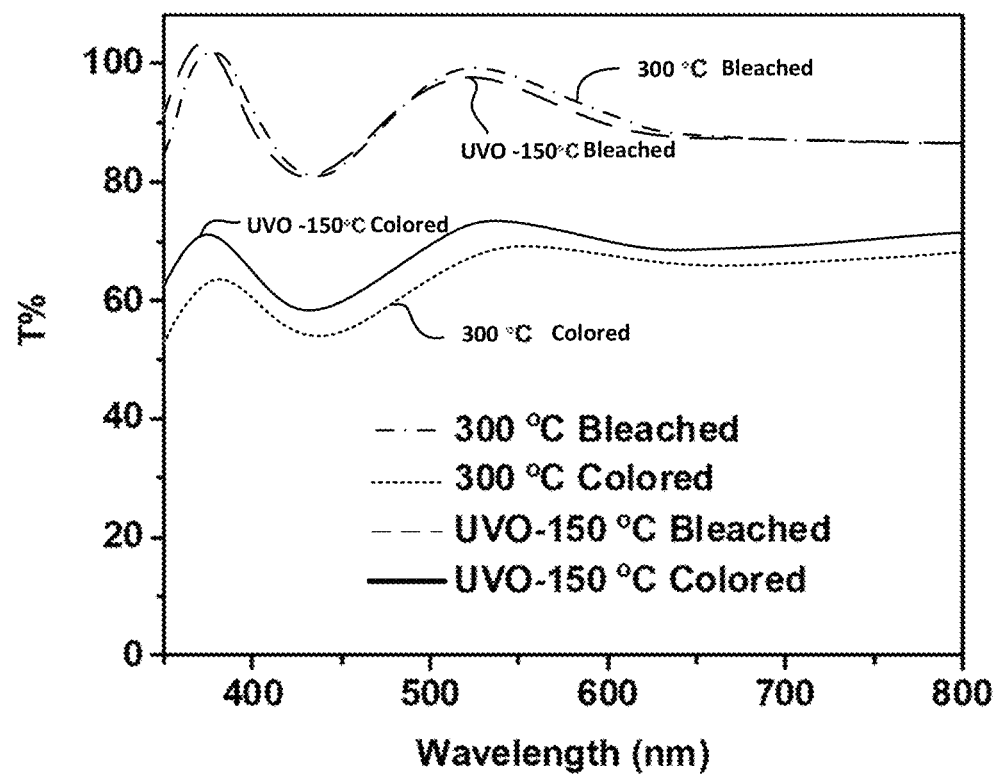
FIGS. 7(A)-(D) contains the following graphs: 7(A) UV-visible spectra of bleached- and colored-states a-$Nb_2O_5$ thin films processed by annealing at 300° C. and UVO-150° C.; 7(B) colorimetry a*b* (CIE 1976 L*a*b* Color Space) color coordinates of bleached- and colored-states a-$Nb_2O_5$ thin films processed by annealing at 300° C. and UVO-150° C.; 7(C) coloration efficiencies of a-$Nb_2O_5$ thin films processed by annealing at 300° C. and UVO-150° C.; and 7(D) UV-visible spectra of UVO-150° C. a-$Nb_2O_5$ thin films with differing thicknesses.

In-situ spectroelectrochemistry was performed to evaluate the hue and transmittance of a-Nb$_2$O$_5$ as an MCC-CE material (see, FIG. 7(A)). In the bleached state, the transmittances of both the UVO-150° C. and 300° C.-annealed a-Nb$_2$O$_5$ thin films are above 85% for most wavelengths ranging from 350 to 800 nm, except the near-UV region (around 430 nm). Because of the antireflection effect of the a-Nb$_2$O$_5$ coating or the smoothing of the ITO/glass substrate, the transmittance is larger than 100% in wavelengths around 370 nm. When the a-Nb$_2$O$_5$ thin films were reduced at −1.8 V vs Ag/AgCl, UVO-150° C. and 300° C.-annealed a-Nb$_2$O$_5$ thin films presented a light gray color in the colored state while their transmittances remained larger than 60% in most of the visible-light wavelength region. However, because of its charge density being at least 1.4 times higher than p-type ECPs (i.e., about 2 mC cm$^{-2}$ to about 5 mC cm$^{-2}$), only part of the capacity will be utilized to balance the charges on the ECPs during color switching. Thus, a-$Nb_2O_5$ thin films could preserve its high transmittance in an ECD.

Figure 7B:
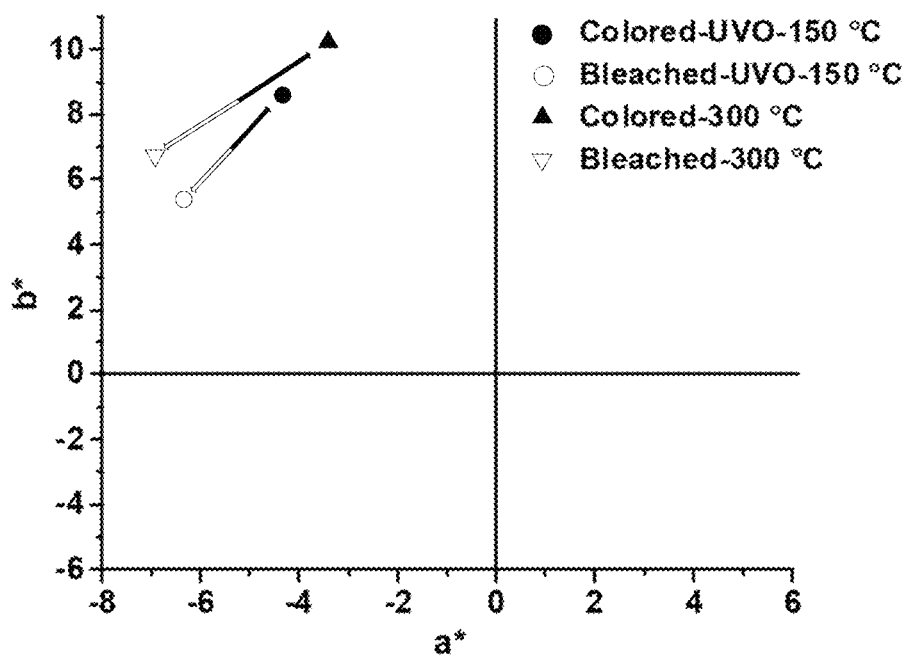

The spectra of the a-$Nb_2O_5$ thin films were used to calculate their L*a*b* color space using Star-Tek colorimetry software. (Note: the negative and positive a* value correspond to green and red colors, respectively; the negative and positive values of b* are related to blue and yellow colors, respectively; L* represents the lightness (see, FIG. 7(B)).) The UVO-150° C. a-$Nb_2O_5$ thin film has smaller values of a* and b* than the 300° C. annealed a-$Nb_2O_5$ thin film in both colored and bleached states, which suggests that UVO-150° C. a-$Nb_2O_5$ thin films have a lower hue. As the CE, UVO-150° C. a-$Nb_2O_5$ thin films offer a higher color purity in ECDs.

Figure 7C:
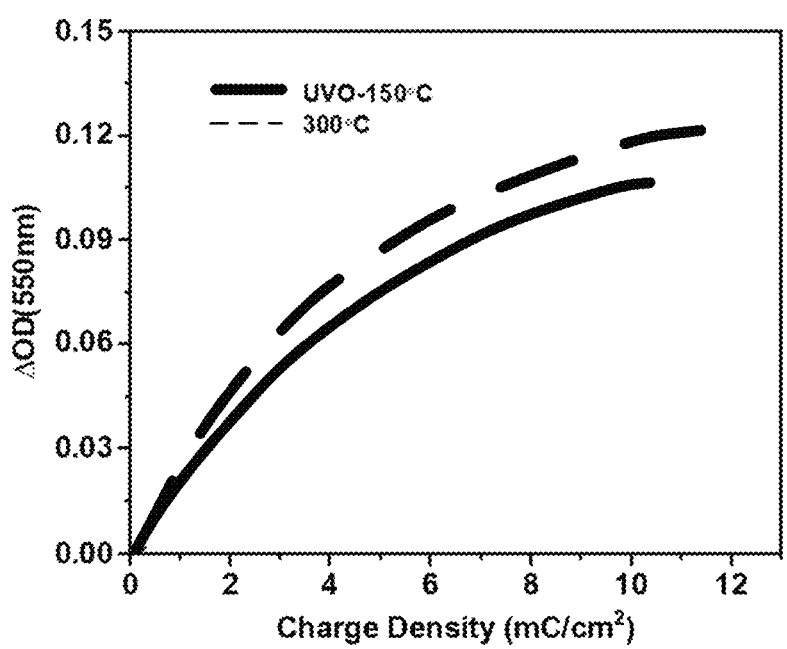

Because only a fraction of the charges would be needed to balance the charge consumption in the ECPs, the coloration efficiency of the a-$Nb_2O_5$ thin film was calculated from the initial slope of the curve of the change of optical density (ΔOD) versus charge density (see, FIG. 7(C)). The coloration efficiency of UVO-150° C. a-$Nb_2O_5$ thin film (16.7 $cm^2 C^{-1}$) was smaller than that of the a-$Nb_2O_5$ thin film annealed at 300° C. (20.7 $cm^2 C^{-1}$). Compared to a-$Nb_2O_5$ thin films annealed at 300° C., UVO-150° C. a-$Nb_2O_5$ thin films have less color change to generate the same amount of charges.

Figure 7D:
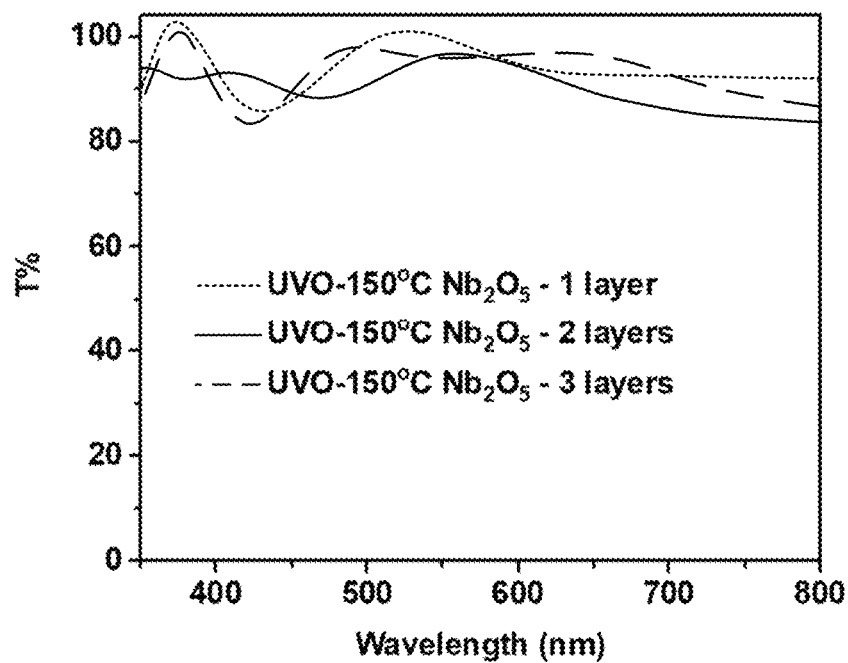

The charge density of the UVO-150° C. a-$Nb_2O_5$ thin film can be adjusted by changing its thickness (number of coating layers) (see, Table, below). Upon increasing the thickness, the a-$Nb_2O_5$ thin films remain highly transmissive with a low hue indicated by the high value of L* (>97.0) and small values of both a* and b* (<6.0) (see, FIG. 7(D)). Therefore, UVO-150° C. a-$Nb_2O_5$ thin films can be paired with a variety of ECPs with different thicknesses in an unbalanced configuration to assemble ECDs that have high optical contrast and color purity. Compared with a-$Nb_2O_5$ thin films annealed at 300° C., the UVO-150° C. a-$Nb_2O_5$ thin films have a similar charge density, better long-term cycle stability, less color hue, and lower coloration efficiency. In the following section, UVO-150° C. a-$Nb_2O_5$ thin films are demonstrated as MCC-CE material in ECDs.

TABLE

Thicknesses, Charge Densities, and Colorimetry L*a*b* (CIE 1976 L*a*b* Color Space) Color Coordinates of a-$Nb_2O_5$ Thin Films with Different Thickness Processed by UVO-150° C.

| Number of layers | Thickness/nm | Charge Density/mC $cm^{-2}$ | L* | a* | b* |
|---|---|---|---|---|---|
| 1 | 50.03 ± 9.83 | 7.2 ± 0.9 | 99.1 | −5.1 | 5.3 |
| 2 | 82.48 ± 8.42 | 9.4 ± 0.4 | 97.8 | −1.9 | 3.3 |
| 3 | 143.19 ± 10.04 | 13.1 ± 1.7 | 98.6 | −1.3 | 3.7 |

Figure 8A:
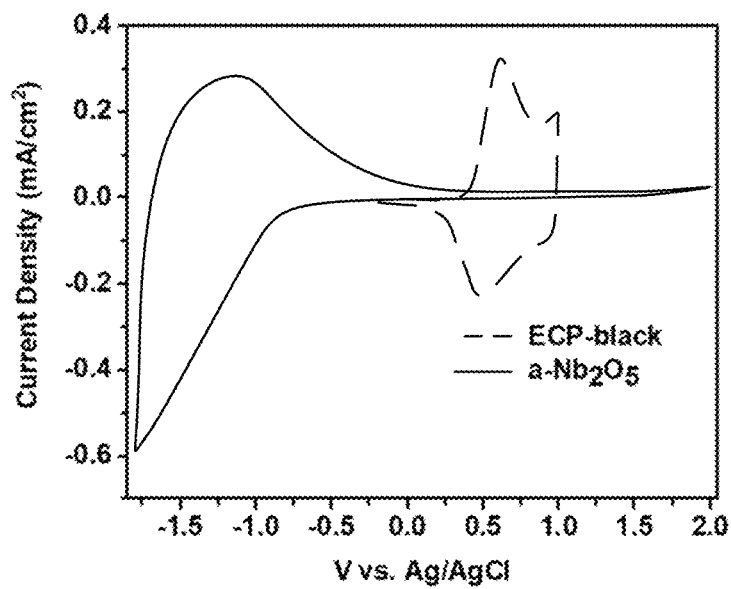
FIGS. 8(A)-(D) contain the following graphs: 8(A) cyclic voltammograms of thin films of electrochromic polymer (ECP)-black and a-$Nb_2O_5$; 8(B) spectroelectrochemistry of the a-$Nb_2O_5$/ECP-black two-electrode cell; 8(C) UV-vis spectra of the a-$Nb_2O_5$ thin film in colored and bleached states and its intermediate state in a bleached a-$Nb_2O_5$/ECP-black two-electrode cell; and 8(D) optical density versus charge density of the a-Nb2O5/ECP-black two-electrode cell.

III.B Example ECDs Utilizing a-$Nb_2O_5$ as the MCC CE
III.B.1 ECD Having a Black ECP Layer as the Working Electrode
III.B.1.i ECD Having a Liquid Electrolyte Two-electrode liquid cells (effectively, ECDs) were assembled to further study the performance of a-$Nb_2O_5$ thin films as the MCC-CE for use with ECPs. The WE was an ECP-black-coated ITO/glass substrate, the CE was an a-$Nb_2O_5$-coated ITO/glass substrate, and the electrolyte was 0.2 M LiTFSI in PC. Both WE and CE were electrochemically conditioned by CV cycling prior to the cell assembly. The charge densities of the ECP-black layer and the a-$Nb_2O_5$ layer were calculated from their CVs to be about 3.0 mC $cm^{-2}$ and 8.0 mC $cm^{-2}$, respectively. Thus, the two-electrode cell was in an unbalanced electrode configuration (see, FIG. 8(A)).

Figure 8B:
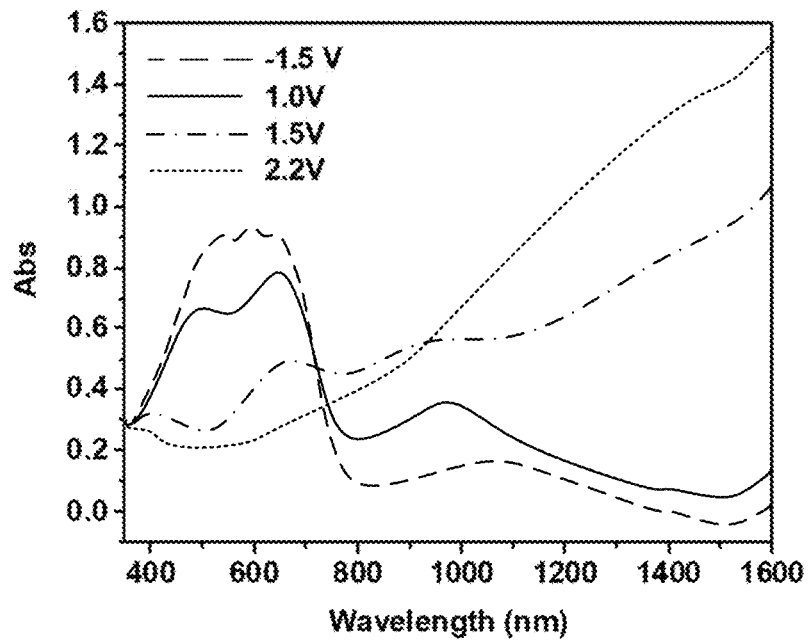

In the spectroelectrochemistry study, the potential of the two-electrode cell was increased from −1.5 to 2.2 V (see, FIG. 8(B)). The broad absorption in the visible region (350-800 nm) was mainly inherited from the ECP-black layer. Broad absorptions in the NIR range, approximately 900 nm and beyond 1000 nm, are related to polarons and bipolarons, respectively. Upon increasing the potential, the absorption in the visible region decreased; the absorption of polarons first increased and then decreased, and the absorption of bipolarons increased dramatically. These results revealed that the a-$Nb_2O_5$ layer balanced the charges in the ECP-black layer during the color switching in a two-electrode ECD.

Figure 8C:
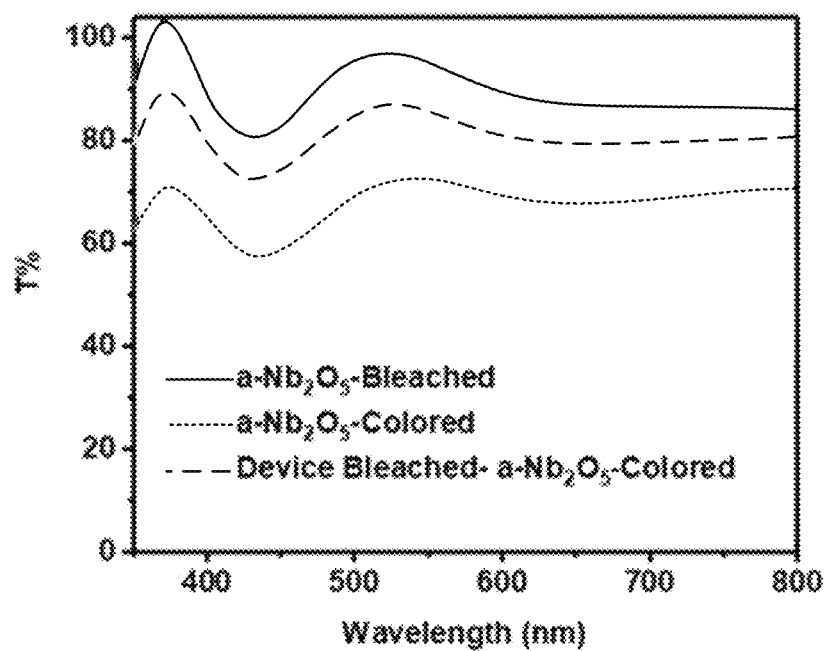
Figure 8D:
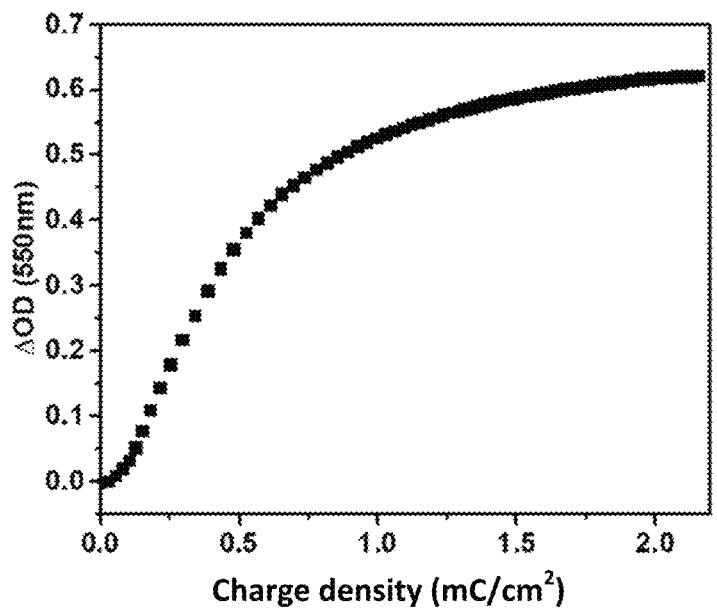

When the cell was oxidized to its bleached state at 2.2 V, the a-$Nb_2O_5$ CE was removed to measure the transmittance spectrum and compared with its spectroelectrochemistry results (see, FIG. 8(C)). The transmittance spectrum of a-$Nb_2O_5$ CE in the bleached device was an intermediate between its spectra of the colored and bleached states, which reveals that a-$Nb_2O_5$ CE was only partially reduced when used as the CE in the two-electrode cell. The partial reduction of the a-$Nb_2O_5$ thin film was sufficient to balance the charges generated during the oxidation of the ECP-black to a bleached state. Therefore, a-$Nb_2O_5$ thin films maintained high transmittance and low hue and functioned as the MCC-CE during the switching of the electrochromic cell. Moreover, the composite coloration efficiency of the two-electrode cell was calculated to be −360.0 mC $cm^{-2}$ at the 95% change in optical contrast (see, FIG. 8(D)).

Figure 9A:
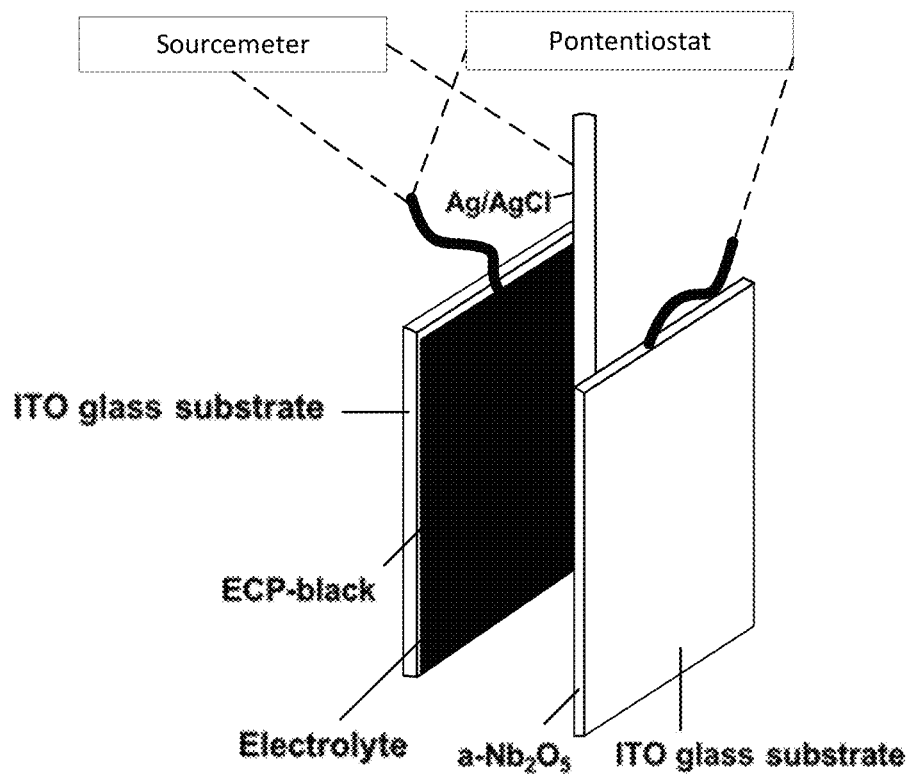
FIGS. 9(A)-(D) contain the following illustration and graphs: 9(A) scheme of the a-$Nb_2O_5$/ECP-black two-electrode cell with a sourcemeter to monitor the potential at the ECP-black working electrode (WE) vs an Ag/AgCl reference electrode; 9(B) cyclic voltammogram of the a-$Nb_2O_5$/ECP-black two-electrode cell; 9(C) change of the potential at the ECP-black WE during cyclic voltammetry (CV) experiments; and 9(D) change of the potential at the ECP-black WE during double-potential step chronoabsorptometry (DPSC) experiments of the a-$Nb_2O_5$/ECP-black two-electrode cell (note: the potential windows where $E_{we}$ increased quickly (in region (1) of FIG. 9(C)), while the potential windows where $E_{we}$ increased at a slow rate or reached a plateau (in region (2) of FIG. 9(C)); the black arrows indicate the beginning of the potential measurements).
Figure 9B:
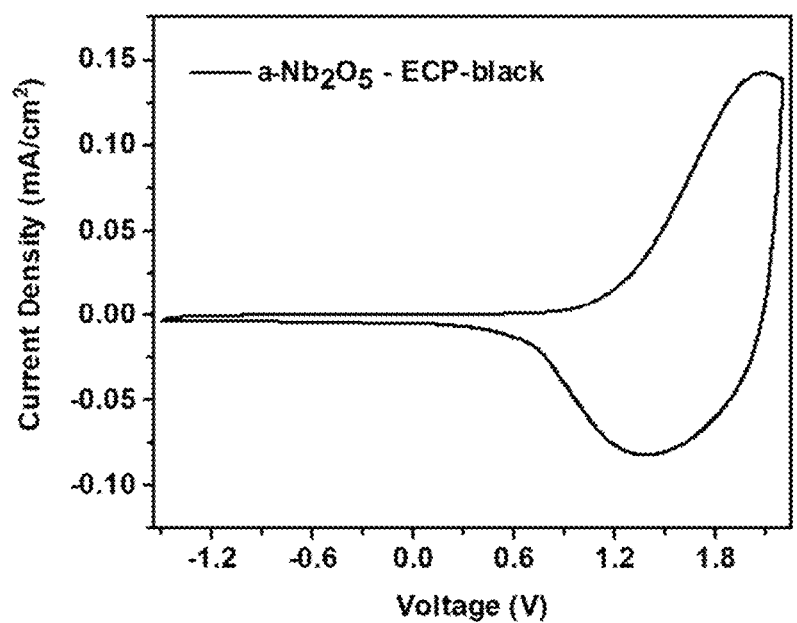
Figure 9C:
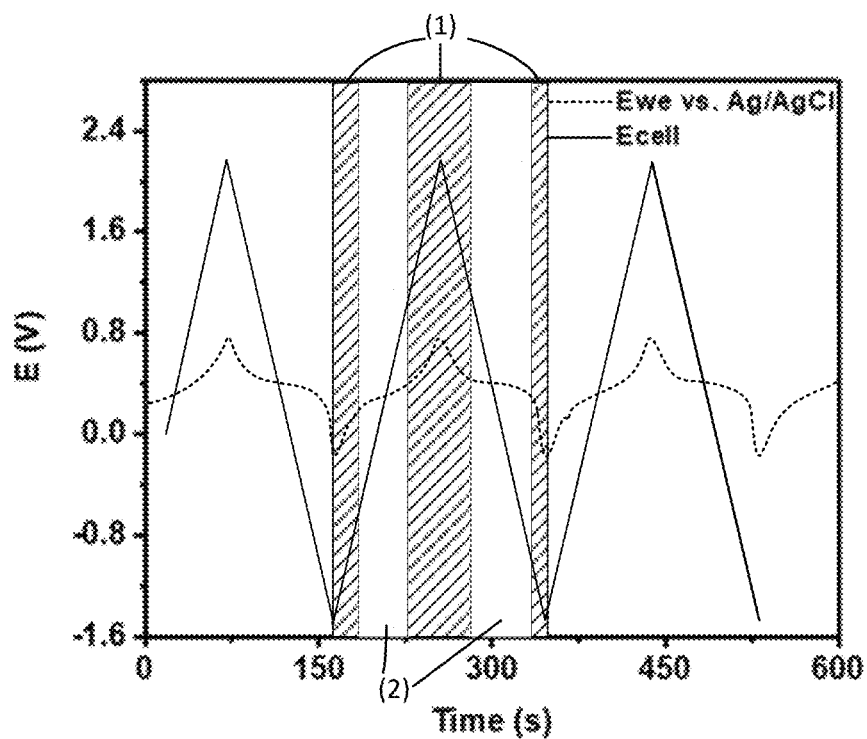

In a two-electrode system, the potential distribution on electrodes affects the optical contrast (ΔT %), switching time, coloration efficiency, and cycle stability of ECDs. For in-situ measurement of the potential distribution, an Ag/AgCl reference electrode was inserted into the two-electrode cell. When the cell potential ($E_{cell}$) was applied between the a-$Nb_2O_5$ CE and ECP-black WE by the potentiostat, the change of the potential distribution on the ECP-black WE ($E_{we}$) versus Ag/AgCl due to the ions intercalation/deintercalation was recorded by a Keithley sourcemeter during the CV and double-potential step chronoabsorptometry (DPSC) experiments (see, FIG. 9(A)). The CV of the two-electrode cell shows a pair of redox peaks at −2.00 V and −1.36 V (see, FIG. 9(B)). After electrochemical conditioning of the two-electrode cell, the potential distribution on the $E_{we}$ was measured versus the Ag/AgCl reference electrode during the CV experiments with the $E_{cell}$ at the scan rate of 40 mV $s^{-1}$ (see, FIG. 9(C)). In the forward scan, the $E_{we}$ increased with increasing the $E_{cell}$ from −1.50 V to 2.2 V at different rates within different potential windows. In the potential windows (in region (1) in FIG. 9(C)) where $E_{cell}$ increased from −1.50 V to −0.60 V and from 1.33 V to 2.20 V, $E_{we}$ increased at rates of 17.2 mV $s^{-1}$ and 13.8 mV $s^{-1}$, respectively. While in the potential window (in region (2) in FIG. 9(C)) of $E_{cell}$ from −0.60 V to 1.33 V, the $E_{we}$ increased at a relatively slower rate of 4.5 mV $s^{-1}$. A similar behavior was also observed in the reverse scan of the CV experiments.

Figure 9D:
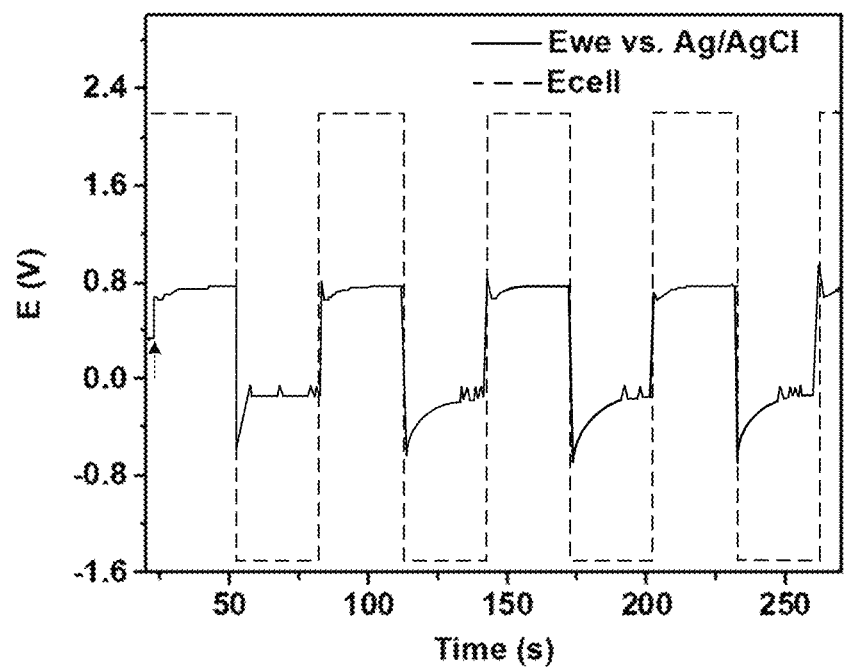
Figure 10:
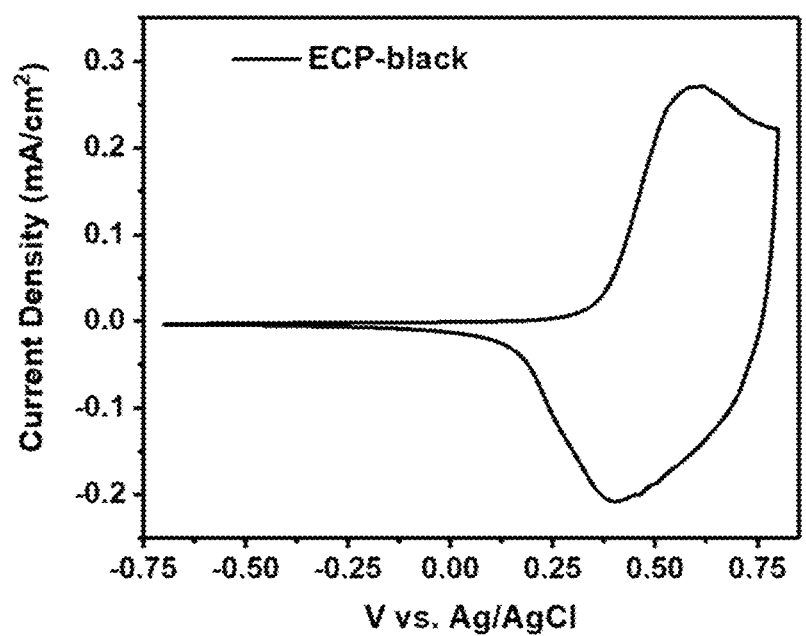
FIG. 10 is a cyclic voltammogram of the ECP-black in 0.2 M lithium bis(trifluoromethane) sulfonimide (LiTFSI) in propylene carbonate (PC) solvent.

During the reverse scan, when Ezell was scanned from 2.20 V to 1.25 V and from −1.00 V and 1.50 V, the $E_{we}$ decreased at rates of 12.8 mV $s^{-1}$ and 34.8 mV $s^{-1}$, respectively. When the $E_{cell}$ was scanned from 1.20 V to −1.00 V, $E_{we}$ reached a plateau at −0.40 V vs Ag/AgCl. The potential windows where $E_{we}$ responded at a slower rate or reached a plateau suggested that ions cannot intercalate/deintercalate freely into/from the ECP-black WE. These phenomena could be due to the ion-trapping in the electrochromic layer, which requires an overpotential to overcome the trapping. In DPSC experiments, the $E_{we}$ was also monitored in situ using 2.2 V and 1.5 V in accordance with the CV and spectro-electrochemistry of the cell (see, FIG. 9(D)). When 2.2 V was applied to the cell, the $E_{we}$ stepped to −0.76 V vs Ag/AgCl. When the $E_{cell}$ was switched from 2.2 V to −1.5 V, the $E_{we}$ quickly changed to −0.68 V vs Ag/AgCl and gradually increased, stabilizing at −0.15 V vs Ag/AgCl. Both potentials were within the stable electrochromic window of ECP-black (FIG. 10). Therefore, these conditions were used in the cycling test of solid-state ECDs.

III.B.1.ii all-Solid-State ECD

Figure 11A:
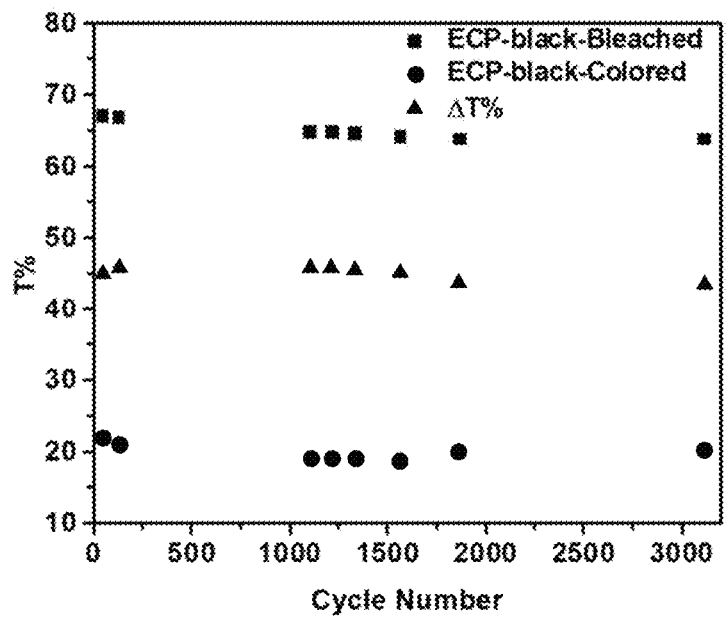
FIGS. 11(A)-(F) contain the following graphs: 11(A) summary of the transmittance at 550 nm in the bleached and colored states and optical contrast of the a-$Nb_2O_5$/ECP-black electrochromic device (ECD) at different cycles; 11(B) DPSC of the a-$Nb_2O_5$/ECP-black ECD monitored at 550 nm at different cycles; 11(C) cyclic voltammogram of the a-$Nb_2O_5$/ECP-magenta ECD; 11(D) summary of the transmittance at 550 nm in the bleached and colored states and optical contrast of the a-$Nb_2O_5$/ECP-magenta ECD at different cycles; 11(E) DPSC of the a-$Nb_2O_5$/ECP-magenta ECD monitored at 550 nm at different cycles; and 11(F) change of optical density versus the charge density of the a-$Nb_2O_5$/ECP-magenta ECD.
Figure 11B:
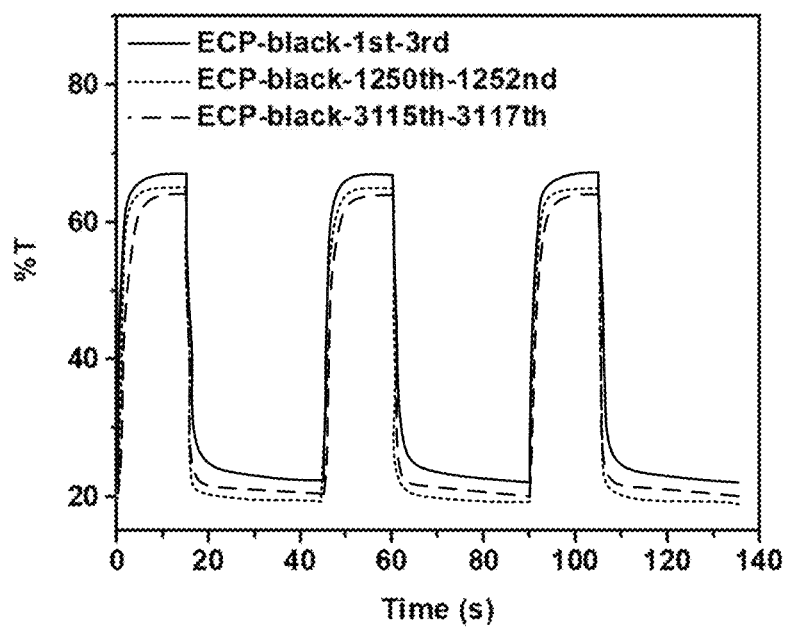
Figure 12:
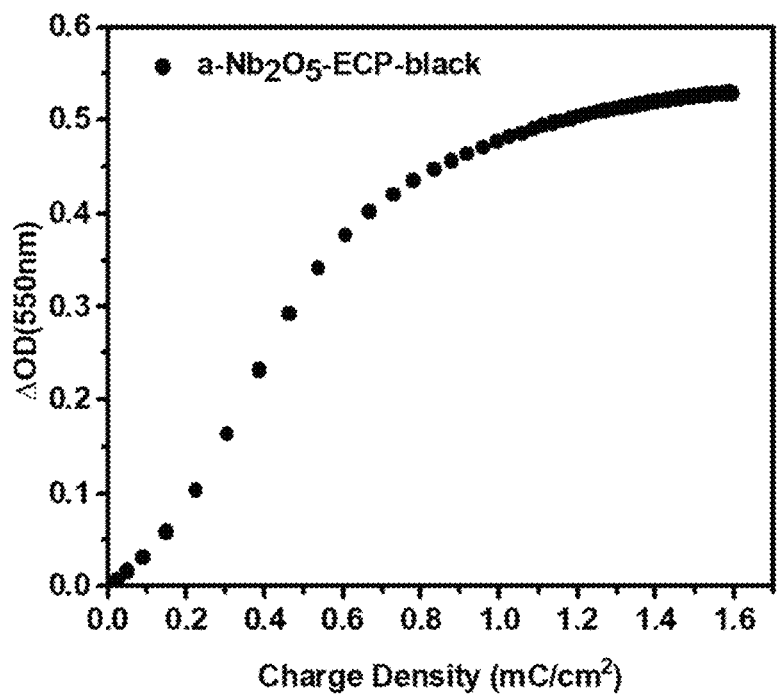
FIG. 12 is a graph illustrating the change in optical density versus charge density of the a-$Nb_2O_5$/ECP-black ECD.

A simple fabrication route is vital to lower the production cost. Thus, the performance of the a-$Nb_2O_5$ electrode without any pretreatment and electrochemical conditioning was used in the two-electrode solid-state devices. The two-electrode solid-state device was assembled by using a-$Nb_2O_5$-coated ITO/glass as the CE electrode, the ECP-black-coated ITO/glass as the WE, and PEGDA plasticized by 50% of the 0.2 M LiTFSI in PC as the gel electrolyte. Because reaching $E_{we}$ equilibrium in the coloring process is slower than the bleaching process, the device was kept at a constant potential of 2.2 V for 15 s and −1.5 V for 30 s to achieve a complete color change (see, FIG. 9(D)). The device showed a ΔT % of ~45% and was stable up to 3100 cycles with −1.4% decreases of ΔT % (see, FIGS. 11(A) and 11(B)). The time to achieve 95% of its full ΔT % is 3.4 and 5.6 s for bleaching and coloring, respectively (see, FIG. 11(B)). The composite coloration efficiency at 95% of the optical contrast ($\eta_{95\%}$) of the solid-state a-$Nb_2O_5$/ECP-black ECD was −393.3 $cm^2$ $C^{-1}$ (FIG. 12).

III.B.2 EDC Having a Magenta ECP Layer as the Working Electrode

Figure 11C:
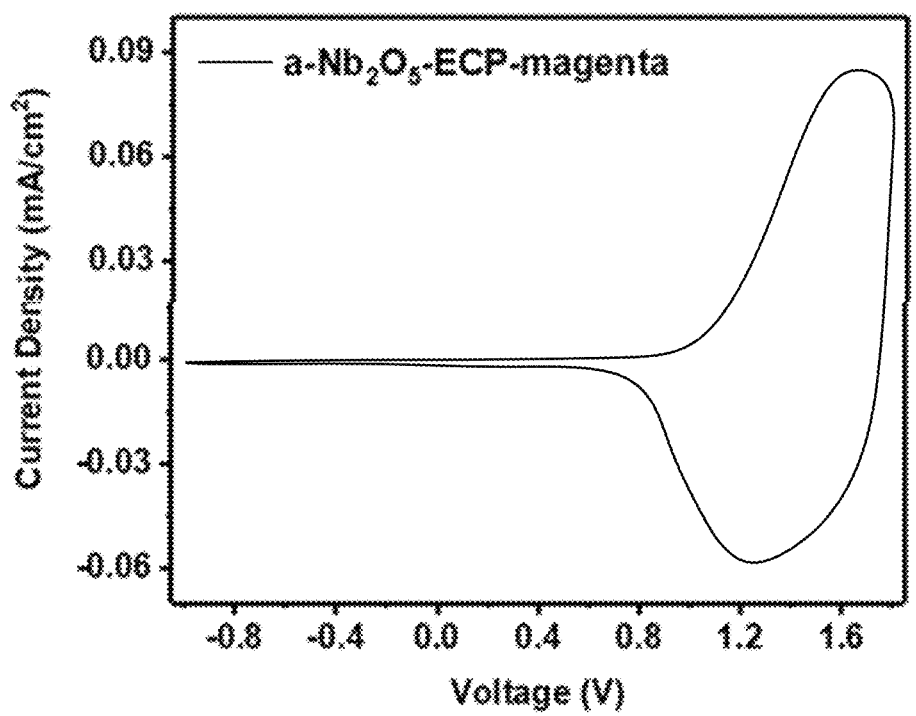
Figure 13:
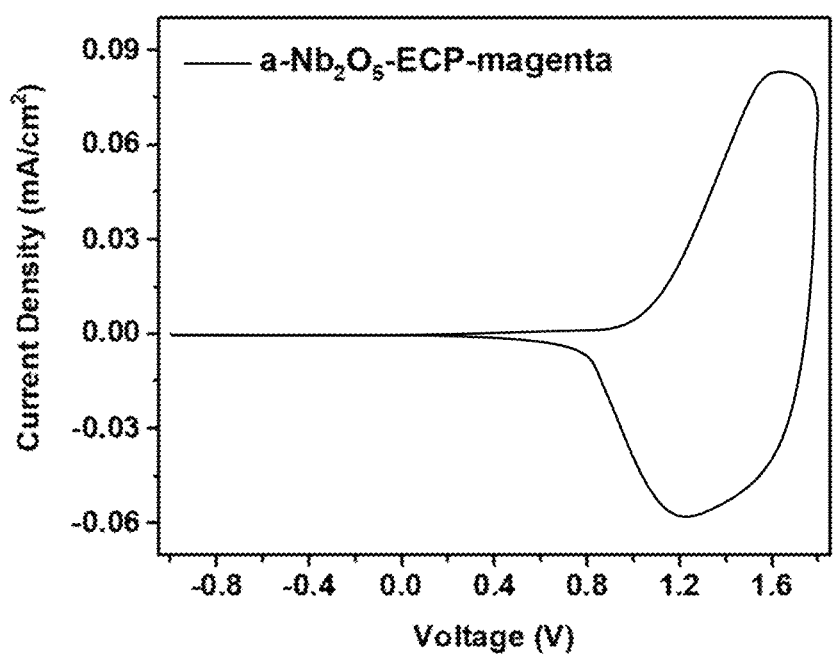
FIG. 13 is a cyclic voltammogram of the $Nb_2O_5$/ECP-black in 0.2 M (LiTFSI) in PC solvent.

An experimental device was also assembled using ECP-magenta as the WE. The ECP-magenta thin film had a charge density of −1.8 mC $cm^{-2}$ and was paired with the a-$Nb_2O_5$ MCC-CE with a charge density of −7.2±0.9 mC $cm^{-2}$ to construct an ECD in an unbalanced configuration. The CV result of the ECD showed a pair of redox peaks at −1.63 V and −1.25 V (see, FIG. 11(C)). Potentials of 1.8 V and −1.5 V were used to switch the device during the DPSC cycling test, and no side reactions within this electrochemical window were observed from the cyclic voltammogram of the a-$Nb_2O_5$/ECP-magenta two-electrode cell (FIG. 13).

Figure 11D:
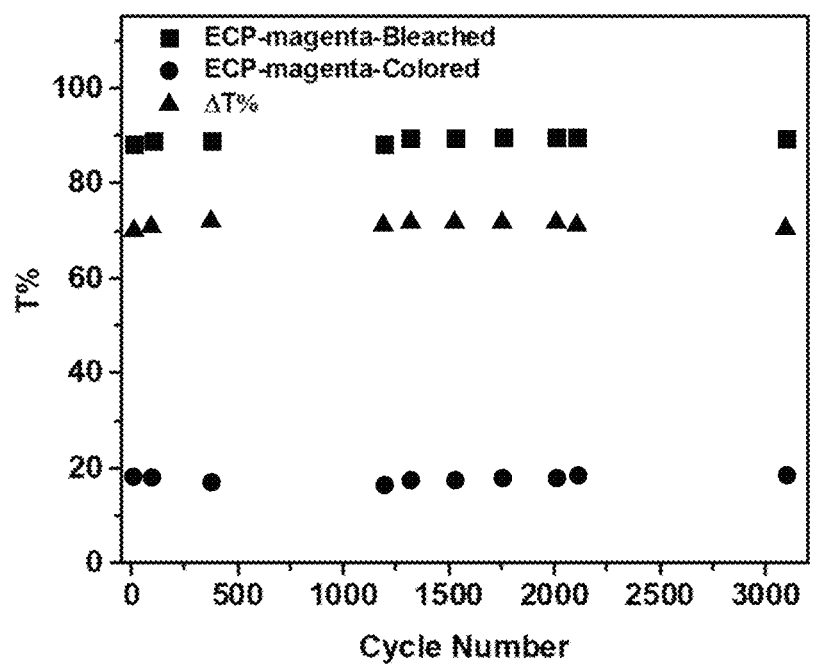
Figure 11E:
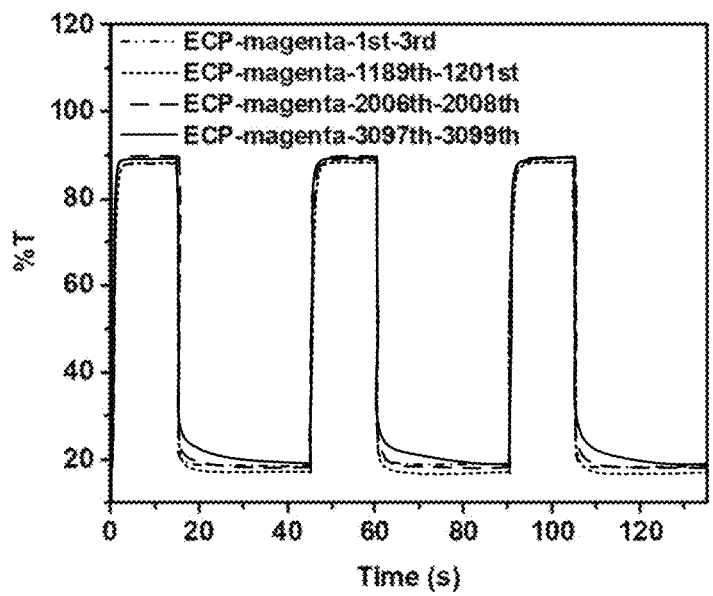
Figure 11F:
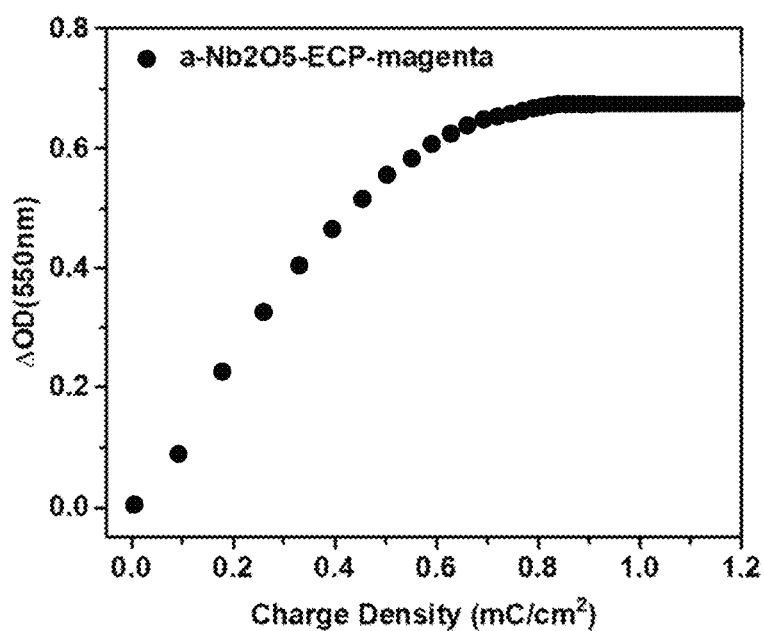

The device could achieve ΔT % of 70% in the first cycle and was able to maintain nearly the same contrast in the following 3100 cycles (see, FIGS. 11(D) and 11(E)). The bleaching and coloring times to achieve 95% of its ΔT % are 1.6 and 0.5 s, respectively (see, FIG. 11(E)). After 3100 cycles, the coloring time increased to 4.8 s, while the bleaching time (~1.0 s) remained similar to the first cycle (see, FIG. 11(E)). At last, the $\eta_{95\%}$ of the a-$Nb_2O_5$/ECP-magenta was calculated to be ~849.5 mC $cm^{-2}$ (see, FIG. 11(F)). The high CCE suggests that the ECD can achieve a high contrast by consuming a very small amount of charges. By using a-$Nb_2O_5$ as the CE materials to balance the charges consumption in electrochromic layers, ECDs of both ECP-black and ECP-magenta showed outstanding cycling stability in double-potential cycling experiments.

Figure 14:
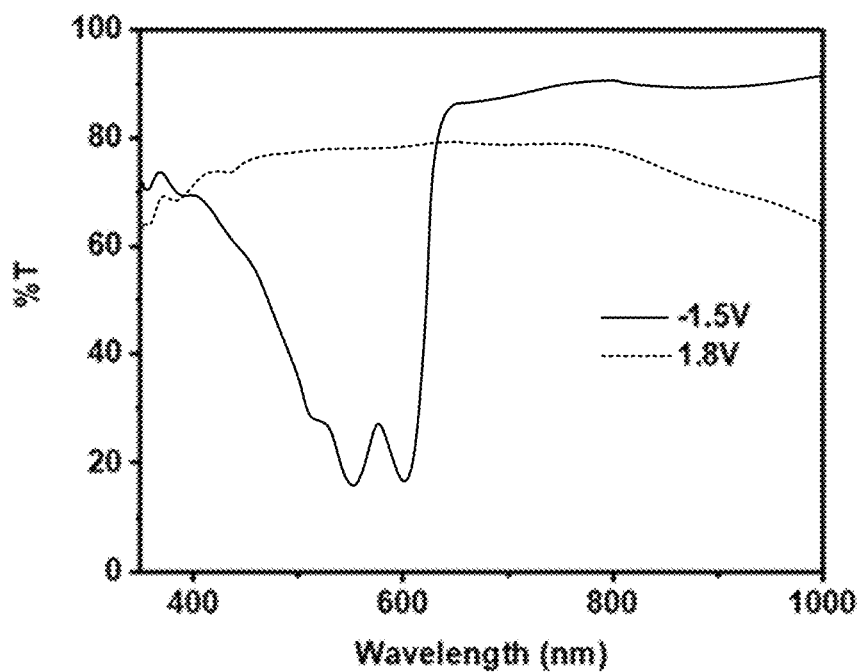
FIG. 14 is a graph illustrating the spectroelectrochemisty of an $Nb_2O_5$/ECP-magenta flexible device.

Low-temperature (e.g., equal to or less than about 150° C.) solution processing that is compatible with flexible substrates is an important factor for large-scale, high-throughput roll-to-roll processing of ECDs. Thus, a UVO-150° C. a-$Nb_2O_5$ thin film was fabricated on the ITO/PET substrates with high uniformity and transparency. The as-assembled flexible device had a ΔT % of 62% at 550 nm (see, FIG. 14). The lower contrast of the flexible device could be due to the higher sheet resistance of ITO/PET substrates (approximately 200 Ω/sq) than the ITO/glass substrates (approximately 8 Ω/sq to approximately 12 Ω/sq). With the demonstration of the flexible ECD, it is evident that high-performance a-$Nb_2O_5$ layers can be fabricated on flexible substrates and serve as the CE for solution-processed low-cost ECDs.

Solution-processed UVO-150° C. a-$Nb_2O_5$ thin films can achieve a similar charge density as that of a-$Nb_2O_5$ thin films annealed at 300° C., yet with an improved cycling stability. Because UVO-150° C. a-$Nb_2O_5$ thin films have a much higher charge density and lower coloration efficiency than ECPs, they were applied as the MCC-CE material to pair with p-type cathodically coloring ECPs. Both a-$Nb_2O_5$/ECP-black and a-$Nb_2O_5$/ECP-magenta solid-state ECDs showed a high contrast, fast switching time, high coloration efficiency, and stable cycling performance. With the development of reliable highly transparent CE materials that can be solution processed on flexible substrates, it can benefit the future roll-to-roll manufacturing electrochromic technology.

III.C Preparation of an Example $TiO_2$ Ion-Storage Layer

Figure 15:
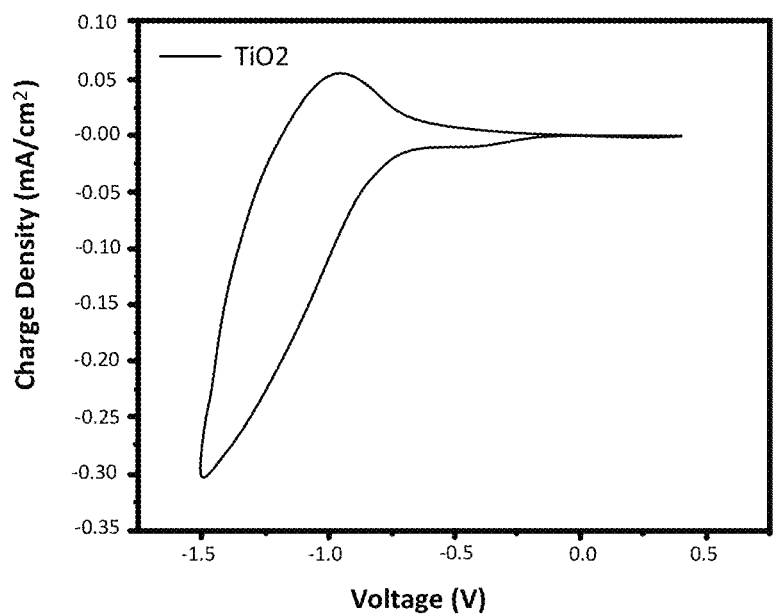
FIG. 15 is a cyclic diagram of an example titanium dioxide ($TiO_2$) ion-storage layer.

To 2 ml of isopropanol in a vial was added 0.66 μl of $Ti(OCH(CH_3)_2)_4$ to make a precursor sol. 100 μl of acetic acid was titrated into the precursor sol. Then, the precursor sol was sonicated by an ultrasonic machine for 10 min. The precursor sol was spin-coated on an ITO-coated transparent conductive substrate at a spin speed of 1000 rpm to form a $TiO_2$ film. The film was placed into a 100° C. oven for 10 minutes to further remove organic solvent and acetic acid to form a condensed film that is the ion-storage layer. FIG. 15 is a cyclic voltammogram of the resulting ion-storage layer, and it can be seen from this figure that the $TiO_2$ thin film has a high storage capacity and good ion electrochemical reversibility.

III.D Preparation of a Doped Metal Oxide Ion-Storage Layer

In a vial, 2 ml of isopropyl alcohol and 10 μl acetic acid was mixed, and then 10 μl of $Ti(OCH(CH_3)_2)_4$ and 50 μl of $Nb(OCH_2CH_3)_5$ were added to make a precursor sol. The precursor sol was sonicated by an ultrasonic machine for 10 min, and the precursor sol was spin-coated onto an ITO-coated transparent conductive substrate at a spin speed of 1500 rpm to form a Ti-doped $Nb_2O_5$ film. The film was placed in a 150° C. oven for 30 minutes to further remove organic solvent and acetic acid.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of making an electrochromic device, the method comprising:
    providing an electrochromic layer comprising a p-type electrochromic material;
    providing an ion-storage layer comprising an n-type metal oxide; and
    tuning the ion-storage layer, the electrochromic layer, or both the ion-storage layer and the electrochromic layer, so that, when the electrochromic device is operating, the ion-storage layer operates in a minimally color changing mode.

2. The method of claim 1, whereas each of the electrochromic layer and the ion-storage layer has a total charge density, and the tuning includes forming the electrochromic layer and the ion-storage layer so that the total charge density of the ion-storage layer is equal to or more than the total charge density of the electrochromic layer.

3. The method of claim 1, wherein the tuning includes forming the electrochromic layer and the ion-storage layer so that the total charge density of the ion-storage layer is at least about 2 times greater than the total charge density of the electrochromic layer.

4. The method of claim 2, wherein the tuning includes selecting the p-type electrochromic material and the n-type metal oxide based on having differing volumetric charge densities.

5. The method of claim 2, wherein each of the ion-storage layer and the electrochromic layer has a thickness determined based on providing the ion-storage layer and the electrochromic layer with differing total charge densities.

6. The method of claim 2, wherein the tuning includes selecting an electrochromic polymer for the p-type electrochromic material.

7. The method of claim 2, wherein the tuning includes forming the ion-storage layer so that the n-type metal oxide forms an amorphous metal-oxide layer.

8. The method of claim 7, wherein the amorphous metal-oxide layer comprises a-$Nb_2O_5$.

9. The method of claim 1, wherein the tuning includes:
    preparing a sol that is a precursor to the ion-storage layer, wherein the sol includes:
        a salt that is a precursor to form a metal oxide within the ion-storage layer;
        a solvent that places the salt into a solution; and
        at least one ligand, at least one acid, or at least one ligand and at least one acid, each selected and provided in an amount to control hydrolysis and condensation during formation of a gel from the sol so that the ion-storage layer has a coloration efficiency of no greater than about 40 $cm^2C^{-1}$;
    coating a conductive substrate with the sol to form a coating; and
    heating the coating to a temperature of no higher than about 150° C. for at least 1 minute so as to promote network formation within the metal oxide.

10. The method of claim 1, wherein each of the electrochromic layer and the ion-storage layer has a coloration efficiency, and the tuning includes configuring the electrochromic layer, the ion-storage layer, or both the electrochromic layer and the ion-storage layer, so that the coloration efficiency of the electrochromic layer is greater than the coloration efficiency of the ion-storage layer.

11. The method of claim 10, wherein the tuning includes selecting the n-type metal oxide so that the ion-storage layer has a coloration efficiency no greater than about 50 $cm^2 C^{-1}$.

12. The method of claim 11, wherein the tuning further includes selecting the p-type metal oxide so that the electrochromic layer has a coloration efficiency at least about 100 $cm^2 C^{-1}$.

13. A method of preparing an ion-storage layer for an electrochromic device, the method comprising:
    preparing a sol that is a precursor to the ion-storage layer, wherein the sol includes:
        a salt that is a precursor to forming a metal oxide within the ion-storage layer;
        a solvent that places the salt into a solution; and
        an acid selected and provided in an amount to control hydrolysis and condensation during formation of a gel from the sol;
    coating a conductive substrate with the sol to form a coating; and
    heating the coating to a temperature of no greater than about 150° C. for at least 1 minute so as to promote network formation within the metal oxide.

14. The method of claim 13, wherein heating the coating includes heating the coating to a temperature in a range of about 20° C. to about 150° C.

15. The method of claim 13, further comprising subjecting the coating to an ultraviolet ozone treatment.

16. The method of claim 13, wherein the ion-storage layer comprises an n-type metal oxide.

17. The method of claim 16, wherein the n-type metal oxide is selected from the group consisting of $TiO_2$, $Ta_2O_5$, $WO_3$, $Nb_2O_5$, $V_2O_5$, $MoO_3$, NiO, ZnO, $Co_3O_4$, $CeO_2$, IrOx, $MnO_2$, $FeO_x$, and combinations thereof.

18. The method of claim 13, wherein the ion-storage layer has a coloration efficiency of no greater than about 50 $cm^2 C^{-1}$.

19. A method of preparing an ion-storage layer for an electrochromic device, the method comprising:
    preparing a sol that is a precursor to the ion-storage layer, wherein the sol includes:
        a salt that is a precursor to forming a metal oxide within the ion-storage layer; and
        a solvent that places the salt into a solution;
    determining whether or not the sol is stable;
    if the sol is stable, then using the solution without any stabilizing additive to prepare the ion-storage layer; and
    if the sol is not stable, then adding one or more stabilizing additives to the solution so as to make the sol stable prior to using the sol to prepare the ion-storage layer.

20. The method of claim 19, wherein adding one or more stabilizing additives includes adding at least one acid or at least one ligand.

* * * * *